(12) United States Patent
Iso et al.

(10) Patent No.: US 8,792,746 B2
(45) Date of Patent: Jul. 29, 2014

(54) IMAGE PROCESSING APPARATUS, IMAGE PROCESSING METHOD, AND PROGRAM

(75) Inventors: Daisuke Iso, Tokyo (JP); Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 175 days.

(21) Appl. No.: 13/411,204

(22) Filed: Mar. 2, 2012

(65) Prior Publication Data

US 2012/0230601 A1 Sep. 13, 2012

(30) Foreign Application Priority Data

Mar. 11, 2011 (JP) ................................ 2011-053728

(51) Int. Cl.
*G06K 9/40* (2006.01)
(52) U.S. Cl.
USPC .......................................... 382/269; 382/266
(58) Field of Classification Search
USPC ................ 382/162, 263–270, 274, 275, 284, 382/298–300, 305, 312, 258; 345/606, 611, 345/629, 639; 358/1.2, 3.26, 3.27, 525
See application file for complete search history.

(56) References Cited

U.S. PATENT DOCUMENTS

| | | | |
|---|---|---|---|
| 5,054,100 A * | 10/1991 | Tai ................................. | 382/300 |
| 6,978,050 B2 * | 12/2005 | Hunter et al. ................. | 382/275 |
| 7,046,862 B2 * | 5/2006 | Ishizaka et al. ............... | 382/298 |
| 7,155,069 B2 * | 12/2006 | Ishizaka ........................ | 382/298 |
| 7,206,101 B2 * | 4/2007 | Avinash ....................... | 358/3.26 |
| 7,283,663 B2 * | 10/2007 | Sobel et al. ................... | 382/162 |
| 7,486,844 B2 * | 2/2009 | Chang et al. .................. | 382/300 |
| 7,881,387 B2 * | 2/2011 | Han et al. ................. | 375/240.25 |
| 8,228,407 B2 * | 7/2012 | Egawa .......................... | 348/272 |
| 2007/0242081 A1 * | 10/2007 | Jeong et al. ................... | 345/606 |

FOREIGN PATENT DOCUMENTS

| | | |
|---|---|---|
| JP | 2004-234623 | 8/2004 |
| JP | 2009-070123 | 4/2009 |
| JP | 2010-067272 | 3/2010 |

* cited by examiner

*Primary Examiner* — Kanjibhai Patel
(74) *Attorney, Agent, or Firm* — Sony Corporation

(57) ABSTRACT

An image processing apparatus includes an edge strength calculating unit that sets, as an input image, a pixel number reduced image obtained by reducing the total number of pixels of an image captured by an imaging element and calculates edge strengths of a plurality of directions in a unit of a pixel block; an interpolated-pixel value calculating unit that calculates interpolated-pixel values as smoothing components of the plurality of directions in the pixel block; a weight calculating unit that calculates weights for the interpolated-pixel values as the smoothing components of the plurality of directions based on the edge strengths; and a blending processing unit that calculates a pixel value of the correction object pixel which is the center pixel of the pixel block by performing a blending process by weighted addition of the interpolated-pixel values, which are the smoothing components of the plurality of directions, and the calculated weights.

14 Claims, 34 Drawing Sheets

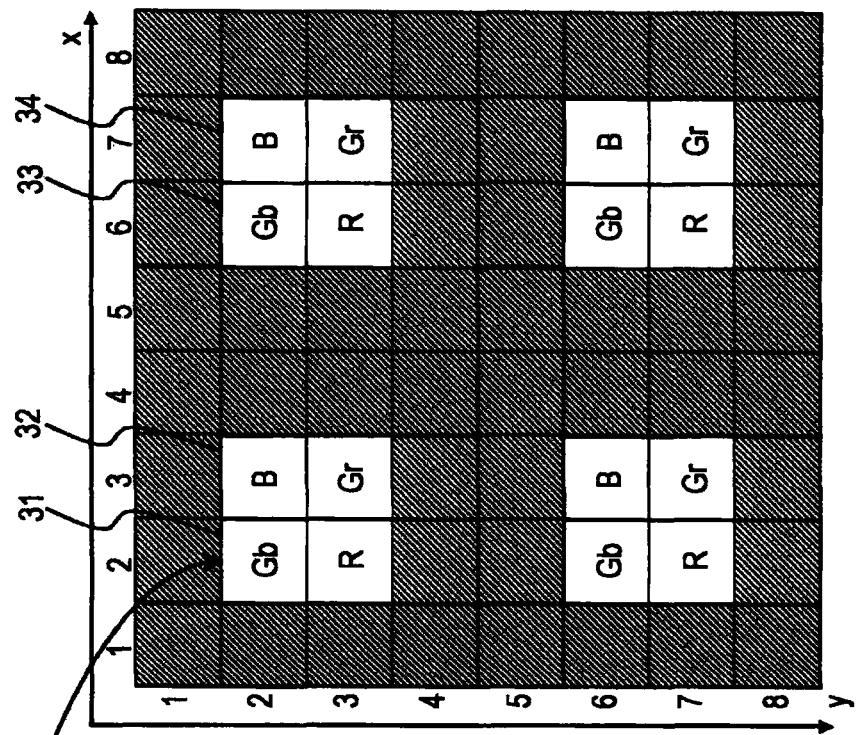

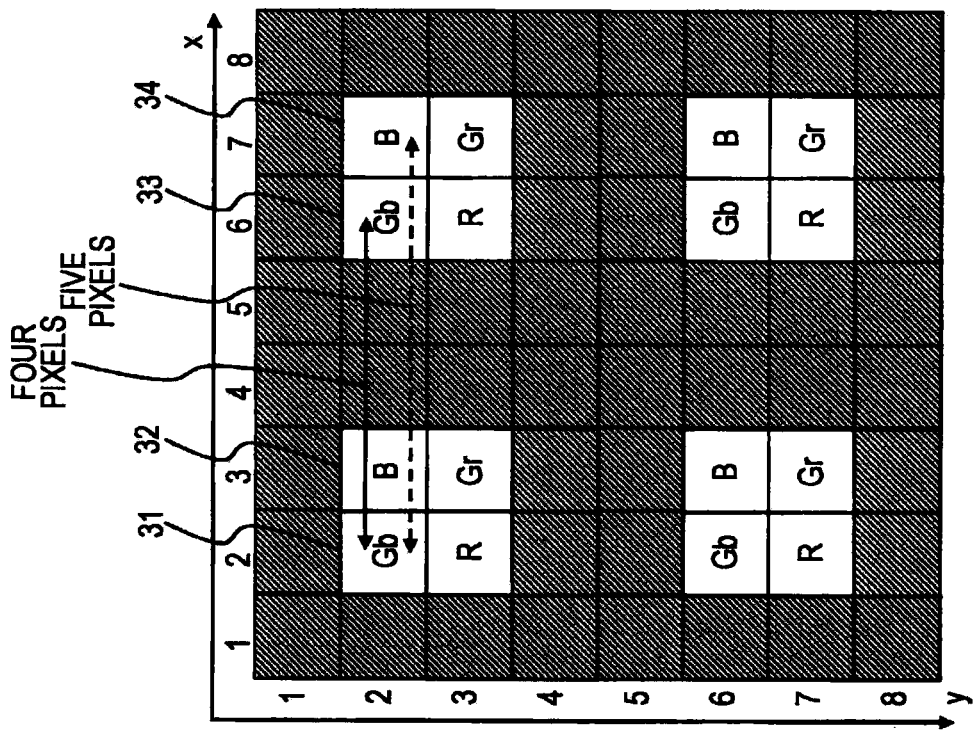
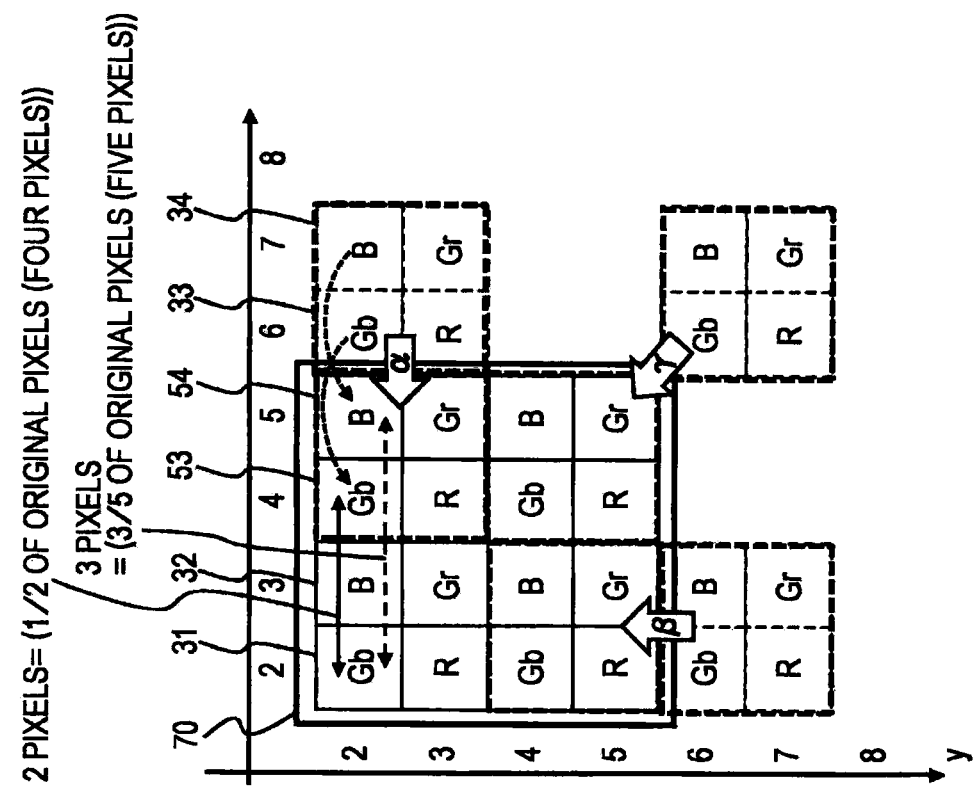

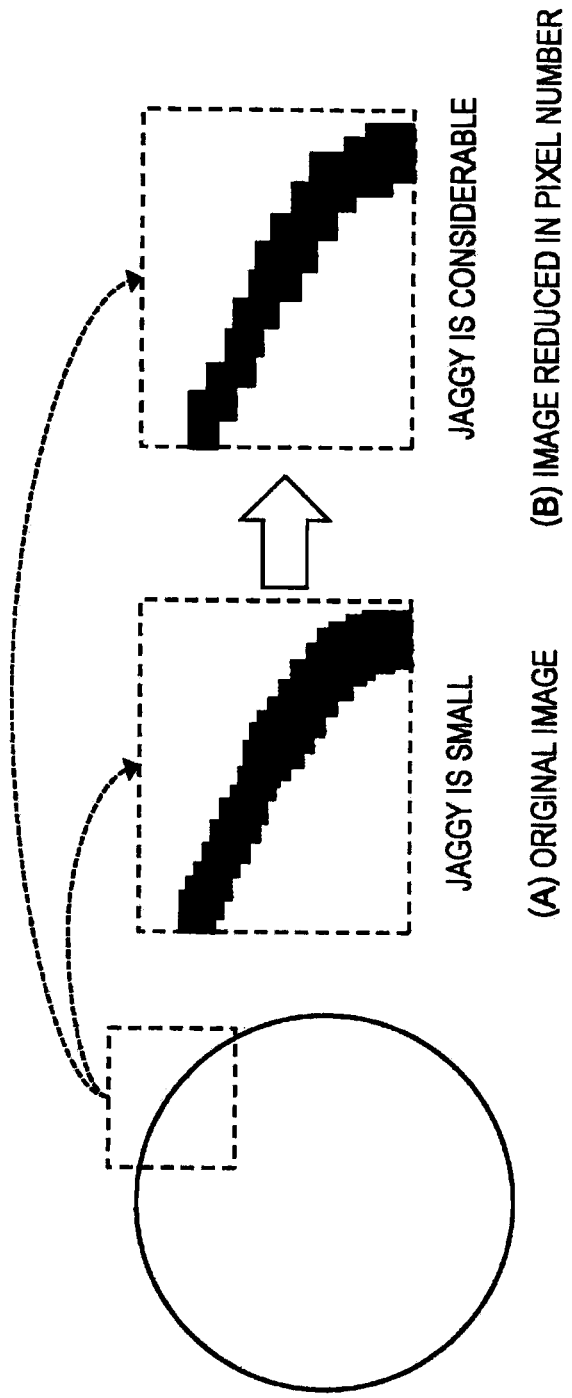

FIG. 10

| 1 | 0 | 6 | 0 | 1 |
|---|---|---|---|---|
| 0 | 16 | 0 | 16 | 0 |
| 6 | 0 | 36 | 0 | 6 |
| 0 | 16 | 0 | 16 | 0 |
| 1 | 0 | 6 | 0 | 1 |

FIG. 12B
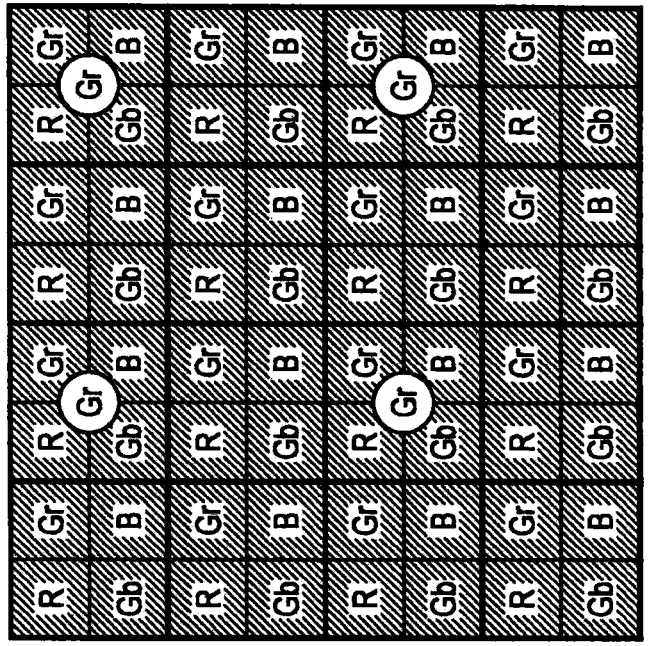
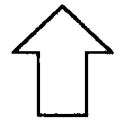
FIG. 12A
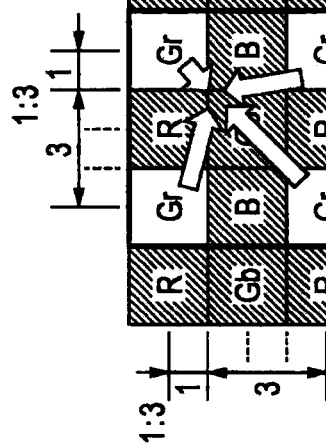
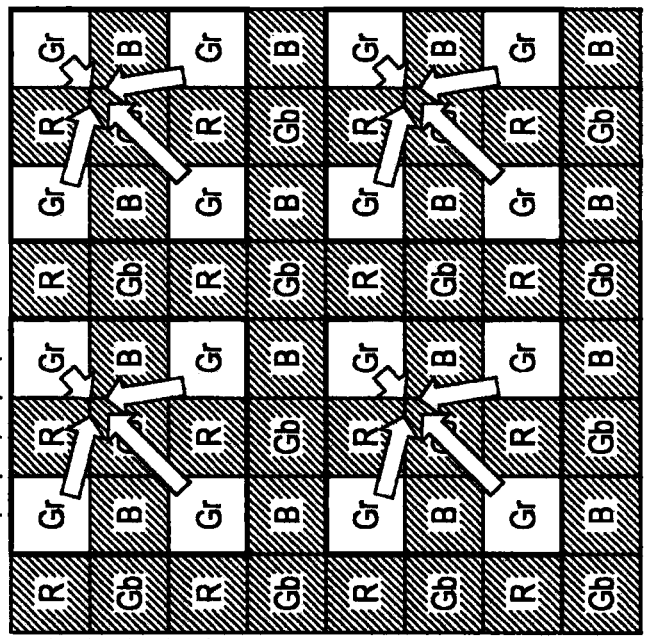

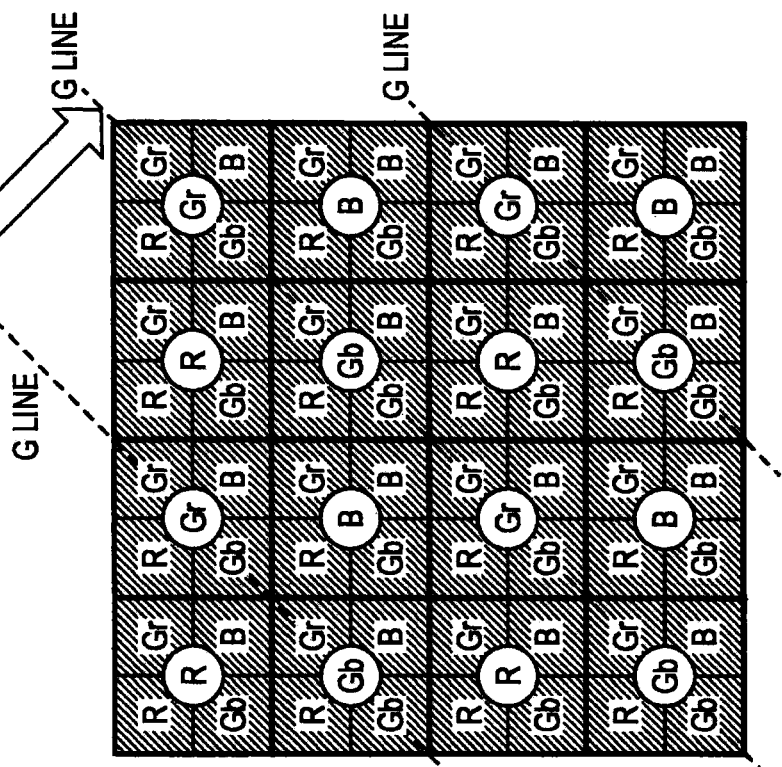
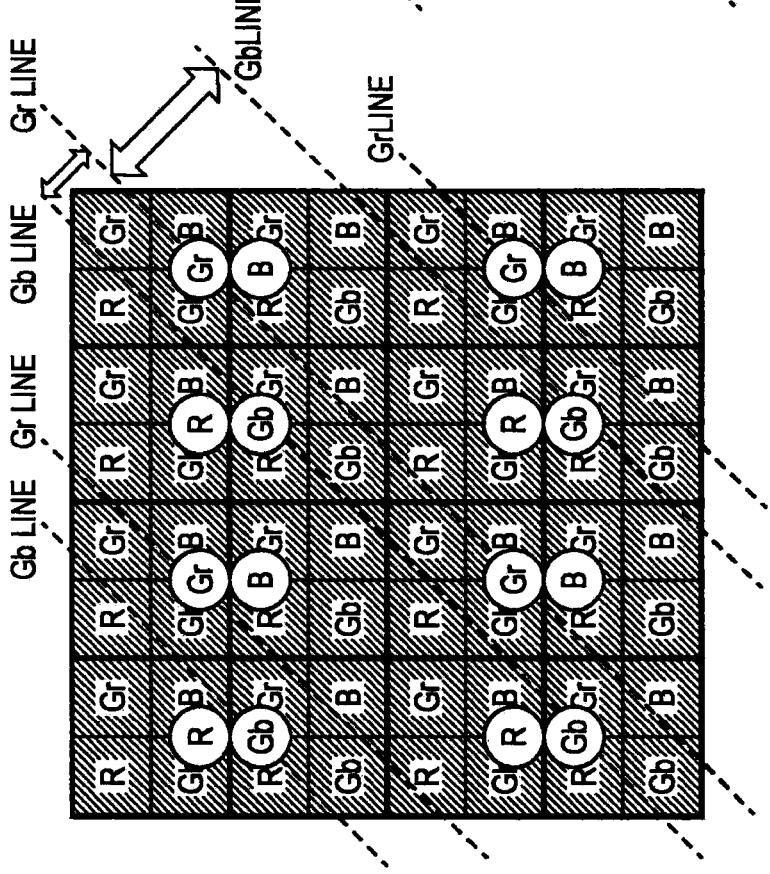
FIG. 13B
FIG. 13A

IMAGE PROCESSING APPARATUS, IMAGE PROCESSING METHOD, AND PROGRAM

BACKGROUND

The present disclosure relates to an image processing apparatus, an image processing method, and a program, and more particularly, to an image processing apparatus, an image processing method, and a program capable of reducing jaggies occurring in an image.

For example, when an image captured by a camera is printed out or is displayed, the image contour of an output object is different from the contour of the original object. That is, the image contour of the output object is output as a step-like saw-toothed contour in some cases.

The step-like saw-toothed shape is generally called jaggies. The jaggies are a kind of aliasing noise. Various image processing methods of reducing the jaggies have hitherto been suggested.

For example, Japanese Unexamined Patent Application Publication No. 2010-67272 discloses a method of reducing the jaggies by determining a direction in which edge detection is performed and by increasing the weight of a smoothing component in a direction further parallel to the edge and performing a blending process in each direction.

However, this method has a problem in that a resolution may deteriorate since the smoothing is performed between the pixels deviated from each other in a direction perpendicular to the edge in a sub-pixel unit when edge preservation smoothing is performed using pixels deviated in its centroid.

Further, Japanese Unexamined Patent Application Publication No. 2009-070123 discloses a method of suppressing the emphasis of the jaggies by allowing an image with a low resolution to have a high resolution near an edge through a high-resolution process.

However, a problem may arise in that the amount of calculation is generally considerable in the high-resolution process and realization is difficult by a small-sized circuit.

Furthermore, Japanese Unexamined Patent Application Publication No. 2004-234623 discloses a method of generating a high-quality image in which the jaggies are reduced by matching and superimposing the positions of the continuously captured images.

In this method, however, a problem may arise in that an edge becomes vague even when the matched positions are slightly deviated from each other, and thus the resolution deteriorates.

Moreover, a problem may also arise in that it is difficult to accurately calculate the position deviation between the images in consideration of both global motion serving as motion information of an entire image and local motion serving as partial motion information and it is difficult to improve the resolution in the whole region of the image.

SUMMARY

It is desirable to provide an image processing apparatus, an image processing method, and a program capable of realizing reduction in jaggies with a simple configuration.

According to an embodiment of the present disclosure, there is provided an image processing apparatus including: an edge strength calculating unit that sets, as an input image, a pixel number reduced image obtained by reducing the total number of pixels of an image captured by an imaging element and calculates edge strengths of a plurality of directions in a unit of a pixel block in which a correction object pixel selected from the input image serves as a center pixel; an interpolated-pixel value calculating unit that calculates interpolated-pixel values as smoothing components of the plurality of directions in the pixel block; a weight calculating unit that calculates weights for the interpolated-pixel values as the smoothing components of the plurality of directions based on the edge strengths of the plurality of directions calculated by the edge strength calculating unit; and a blending processing unit that calculates a pixel value of the correction object pixel which is the center pixel of the pixel block by performing a blending process by weighted addition of the interpolated-pixel values, which are the smoothing components of the plurality of directions, and the weights calculated by the weight calculating unit.

In the image processing apparatus according to the embodiment of the present disclosure, the plurality of directions may be four directions of a horizontal direction, a vertical direction, a right upper direction, and a left upper direction.

In the image processing apparatus according to the embodiment of the present disclosure, the pixel number reduced image may be an image having a Bayer arrangement image.

In the image processing apparatus according to the embodiment of the present disclosure, the pixel number reduced image may be an image having a Bayer arrangement image and the correction object pixel is a G pixel.

In the image processing apparatus according to the embodiment of the present disclosure, the edge strength calculating unit may calculate a plurality of Laplacian absolute values in the unit of the pixel block in which the correction object pixel serves as the center pixel and calculate the edge strengths of the plurality of directions at a position of the correction object pixel by applying the plurality of calculated Laplacian absolute values.

In the image processing apparatus according to the embodiment of the present disclosure, the interpolated-pixel value calculating unit may calculate the plurality of smoothing components based on pixel values of pixels present in a line of a specific direction set in the pixel block and calculate an interpolated-pixel value as the smoothing component corresponding to the correction object pixel based on the plurality of calculated smoothing components.

In the image processing apparatus according to the embodiment of the present disclosure, the interpolated-pixel value calculating unit may calculate the interpolated-pixel values based on pixels included in the pixel number reduced image and in which centroid deviation occurs.

In the image processing apparatus according to the embodiment of the present disclosure, the weight calculating unit may perform a clipping process of applying a predefined clipping function to each of the edge strengths of the plurality of directions calculated by the edge strength calculating unit and calculate the weights for the interpolated-pixel values as the smoothing components of the plurality of directions based on the edge strengths of the plurality of directions subjected to the clipping process.

In the image processing apparatus according to the embodiment of the present disclosure, the pixel number reduced image may be an image having a Bayer arrangement image and the correction object pixel is a G pixel. The image processing apparatus may further include a demosaic processing unit that performs a demosaic process on a corrected image having the G pixel output by the blending processing unit.

In the image processing apparatus according to the embodiment of the present disclosure, the demosaic processing unit may perform the demosaic process of setting RGB pixel values of the respective pixels using a correlation between the G and R pixels in a Bayer arrangement and a correlation between the G and B pixels in the Bayer arrangement.

According to another embodiment of the present disclosure, there is provided an image processing apparatus including an image correcting unit that calculates an edge direction passing through a center of an object G pixel in a raw image obtained through a pixel adding or thinning process in an imaging element based on a resolution of the raw image which is not subjected to the pixel adding or thinning process and that projects a G pixel near in a straight line perpendicular to the calculated edge direction, performs a re-sampling process on the projected G pixel in a direction perpendicular to an edge, performs a process of determining the pixel value of the object G pixel using a re-sampled signal which is a pixel value of the re-sampled pixel.

In the image processing apparatus according to the embodiment of the present disclosure, the image correcting unit may determine the pixel value of the object G pixel by expressing the edge direction by a linear sum of the edge components of predetermined specific directions, performing the re-sampling process on each edge component of the specific direction, and calculating a weighted mean of the re-sampled signals of the plurality of specific directions at a ratio substantially identical to that of the edge components of the expressed linear sum.

According to still another embodiment of the present disclosure, there is provided an imaging apparatus including: an imaging element; a pixel number reducing unit that generates a pixel number reduced image by reducing the total number of pixels of an image captured by the imaging element; an edge strength calculating unit that sets the pixel number reduced image as an input image and calculates edge strengths of a plurality of directions in a unit of a pixel block in which a correction object pixel selected from the input image serves as a center pixel; an interpolated-pixel value calculating unit that calculates interpolated-pixel values as smoothing components of the plurality of directions in the pixel block; a weight calculating unit that calculates weights for the interpolated-pixel values as the smoothing components of the plurality of directions based on the edge strengths of the plurality of directions calculated by the edge strength calculating unit; and a blending processing unit that calculates a pixel value of the correction object pixel which is the center pixel of the pixel block by performing a blending process by weighted addition of the interpolated-pixel values, which are the smoothing components of the plurality of directions, and the weights calculated by the weight calculating unit.

According to further still another embodiment of the present disclosure, there is provided an image processing method of processing an image in an image processing apparatus. The image processing method includes: setting, by an edge strength calculating unit, a pixel number reduced image obtained by reducing the total number of pixels of an image captured by an imaging element as an input image and calculating edge strengths of a plurality of directions in a unit of a pixel block in which a correction object pixel selected from the input image serves as a center pixel; calculating, by an interpolated-pixel value calculating unit, interpolated-pixel values as smoothing components of the plurality of directions in the pixel block; calculating, by a weight calculating unit, weights for the interpolated-pixel values as the smoothing components of the plurality of directions based on the edge strengths of the plurality of directions calculated by the edge strength calculating unit; and calculating, by a blending processing unit, a pixel value of the correction object pixel which is the center pixel of the pixel block by performing a blending process by weighted addition of the interpolated-pixel values, which are the smoothing components of the plurality of directions, and the weights calculated by the weight calculating unit.

According to further still another embodiment of the present disclosure, there is provided a program causing an image processing apparatus performing image processing to execute: setting, by an edge strength calculating unit, a pixel number reduced image obtained by reducing the total number of pixels of an image captured by an imaging element as an input image and calculating edge strengths of a plurality of directions in a unit of a pixel block in which a correction object pixel selected from the input image serves as a center pixel; calculating, by an interpolated-pixel value calculating unit, interpolated-pixel values as smoothing components of the plurality of directions in the pixel block; calculating, by a weight calculating unit, weights for the interpolated-pixel values as the smoothing components of the plurality of directions based on the edge strengths of the plurality of directions calculated by the edge strength calculating unit; and calculating, by a blending processing unit, a pixel value of the correction object pixel which is the center pixel of the pixel block by performing a blending process by weighted addition of the interpolated-pixel values, which are the smoothing components of the plurality of directions, and the weights calculated by the weight calculating unit.

The program according to the embodiment of the present disclosure is a program that is supplied to, for example, an information processing apparatus or a computer system capable of executing various program codes by a storage medium or a communication medium provided in a computer-readable format. By providing the program in the computer-readable format, the processes are realized in accordance with the program on the information processing apparatus or the computer system.

The other objectives, features, or advantages of the embodiments of the present disclosure are apparent from the detailed descriptions of embodiments described below or the accompanying drawings. Further, a system in the specification has a logic collection configuration of a plurality of apparatuses. The apparatuses with a separate configuration may not be included in the same casing.

According to the configuration of an embodiment of the present disclosure, it is possible to create a high-quality image in which the jaggies are reduced through the process of correcting the pixel number reduced image.

Specifically, for example, a pixel number reduced image obtained by reducing the total number of pixels of an image captured by an imaging element is set as an input image, edge strengths of a plurality of directions are calculated in a unit of a pixel block in which a correction object pixel selected from the input image serves as a center pixel, interpolated-pixel values are calculated as smoothing components of the plurality of directions in the pixel block, weights for the interpolated-pixel values are calculated as the smoothing components of the plurality of directions based on the edge strengths of the plurality of directions calculated by the edge strength calculating unit; and a pixel value of the correction object pixel which is a center pixel of the pixel block is calculated by performing a blending process by weighted addition of the interpolated-pixel values, which are the smoothing components of the plurality of directions, and the weights calculated by the weight calculating unit. The centroid deviation in the pixel number reduced image is corrected through the processes, thereby reducing the jaggies.

BRIEF DESCRIPTION OF THE DRAWINGS

FIGS. 1A and 1B are diagrams illustrating a problem with a pixel number reducing process;

FIGS. 2A and 2B are diagrams illustrating the problem with the pixel number reducing process;

FIG. 3 is a diagram illustrating generation of jaggies which are a problem in the pixel number reducing process;

FIG. 10 is a diagram illustrating an example of a filter structure used for calculating the weighted mean of the Laplacian absolute values;

FIGS. 12A and 12B are diagrams illustrating the pixel adding process in which an addition ratio is set to 1:3 of both horizontal and vertical directions;

FIGS. 13A and 13B are diagrams illustrating an example of a difference in a sampling interval of the right upper inclination direction when deviation in the pixel centroids occurs and when deviation in the pixel centroids does not occur;

FIG. 14 is a diagram illustrating an example of an interpolating process when an adding process is performed at horizontal 1:1 and vertical 1:1 ratios;

FIG. 18 is a diagram illustrating an example of an interpolating process when an adding process is performed at horizontal 1:3 and vertical 1:1 ratios;

DETAILED DESCRIPTION OF EMBODIMENTS

Figure 4:
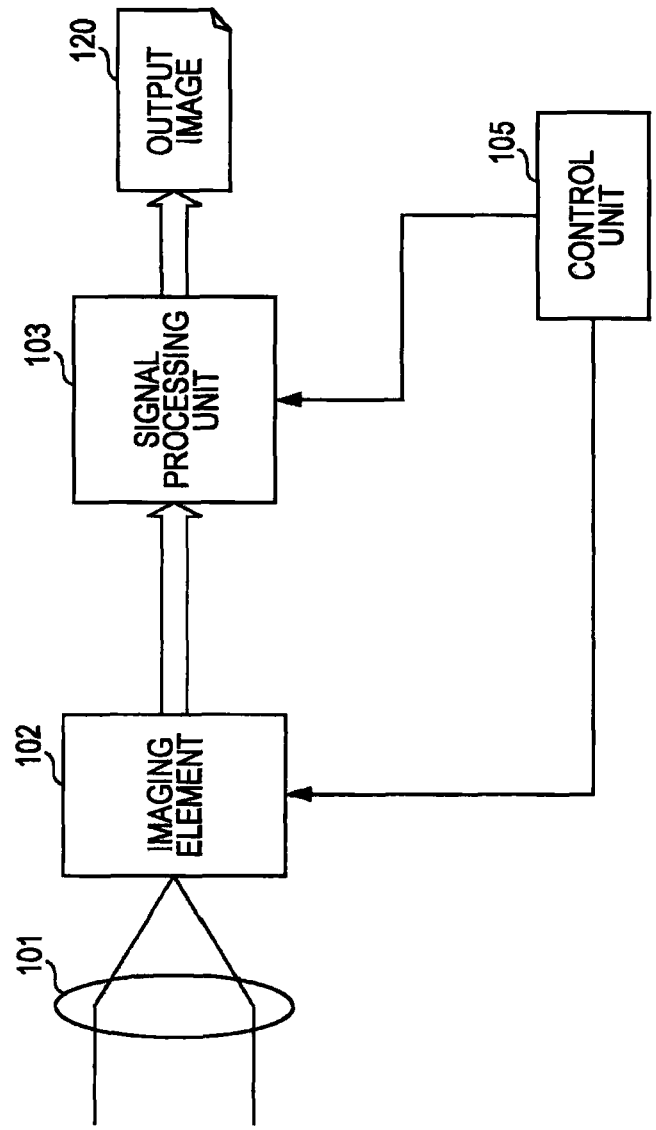
FIG. 4 is a diagram illustrating an example of the configuration of an imaging apparatus which is an example of an image processing apparatus.

Hereinafter, an image processing apparatus, an image processing method, and a program of embodiments of the present disclosure will be described with reference to the drawings. The description thereof will be made in the following order.

1. Generation of Jaggies in Image
2. Example of Configuration of Image Processing Apparatus
3. Overview of Process of Signal Processing Unit
4. Process of Image Correction Unit
4-1. (First Process) Process of Calculating Edge Strengths ($D_H$, $D_V$, $D_R$, and $D_L$) of Total of Four Directions, that is, Horizontal (H), Vertical (V), Right Upper (R), and Left Upper (L) Directions Using G Components of Pixel Number Reduced Image (Raw Image)
4-2. (Second Process) Process of Calculating Smoothing G components ($G_H$, $G_V$, $G_R$, and $G_L$) of Total of Four Directions, that is, Horizontal (H), Vertical (V), Right Upper (R), and Left Upper (L) Directions
4-3. (Third Process) Process of Determining Weights ($W_H$, $W_V$, $W_R$, and $W_L$) to be Multiplied to Smoothing G Components ($G_H$, $G_V$, $G_R$, and $G_L$) of Horizontal (H), Vertical (V), Right Upper (R), and Left Upper (L) Directions Calculated through Second Process in Accordance with Edge Strengths ($D_H$, $D_V$, $D_R$, and $D_L$) of Four Directions Calculated through First Process
4-4. (Fourth Process) Process of Calculating Output Pixel Values by Blending Process of Multiplying Smoothing G Components ($G_H$, $G_V$, $G_R$, and $G_L$) of Horizontal (H), Vertical (V), Right Upper (R), and Left Upper (L) Directions Calculated through Second Process by Weights ($W_H$, $W_V$, $W_R$, and $W_L$) Calculated through Third Process
5. Demosaic Process
6. Process Corresponding to Edge of Arbitrary Direction
7. Overview of Configuration and Process of Image Correcting Unit
7-1. Process of Bias Value Calculating Unit
7-2. Process of Four Direction Edge Strength Calculation 7-3. Process of Four-direction Interpolated-Pixel Value Calculating Unit 7-4. Process of Four Direction Weight Calculating Unit 7-5. Process of Blending Processing Unit 8. Overview of Configuration of the Present Disclosure 1. Generation of Jaggies in Image As described above, when an image captured by a camera is printed and output or is displayed, the image contour of an object contained in the output image is different from the contour of the original object. That is, the image contour of the object is output as a step-like saw-toothed contour in some cases. The saw-toothed shape is generally called jaggies.

For example, the jaggies are generated even when an output image in which the number of pixels is reduced created by performing a pixel thinning process or a pixel synthesizing process on an image captured by a high-resolution imaging element with the large number of pixels.

The recent many imaging apparatuses have an imaging element with the very large number of pixels such as several millions of pixels to several tens of millions of pixels to capture a high-resolution image.

However, a display apparatus capable of outputting a high-resolution image corresponding to an image with the number of pixels of the imaging element is less used. Further, when a high-resolution image output from the imaging element is recorded without any change, the memory capacity necessary for recording the high-resolution image may be increased, and thus the number of images to be recorded may be decreased.

In the light of this circumstance, in many cases, an imaging apparatus including an imaging element with a large number of pixels performs a process of reducing the total number of pixels and recording the pixels reduced in number in a memory by performing a process of thinning the number of output pixels without recording a pixel signal output from the imaging element without any change or a synthesizing process including an addition operation of a plurality of pixels.

However, a problem may arise in that jaggies are generated in an output image due to the pixel number converting process.

The jaggies generated due to the reduction in the number of pixels will be described with the drawings.

FIG. 1A shows a pixel arrangement (Bayer arrangement) of an imaging element and FIG. 1B shows pixel centroids of output pixels.

The pixel arrangement shown in FIG. 1A is a pixel arrangement in which the large number of pixels of an imaging element is arranged. A captured image has pixel information regarding the large number of pixels. An image to be stored in a memory is created by reducing the number of pixels. For example, the pixel value of a single pixel of an output image is set and output based on four pixels with the same color in the imaging element shown in FIG. 1A.

That is, the total number of pixels is reduced by aggregating four pixels to a single pixel and outputting the single pixel.

In FIG. 1B, the pixel centroid of an output pixel is a pixel centroid the output pixels after reduction in the number of pixels in the original imaging element.

For example, a Gb pixel 31 shown in FIG. 1B has a pixel value determined evenly using the pixel values of Gb pixels in four corners of a 3×3 pixel block 21 shown in FIG. 1A. A pixel centroid is set at the central position of the 3×3 pixel block 21. A pixel presenting the centroid position is a Gb pixel 31 shown in FIG. 1B.

FIGS. 1A and 1B show an example of a process of reducing the number of pixels of the output image to 1/4 the number of pixels of the imaging element, that is, reducing 8×8=64 pixels shown in FIG. 1A to 4×4=16 pixels shown in FIG. 1B.

In this process, for example, an addition averaging process is performed on the Gb pixels in the four corners of the 3×3 pixel block 21 shown in FIG. 1A, and then the pixel value of a single Gb pixel of the output image is calculated.

That is, the pixel value of the Gb pixel 31 shown in FIG. 1B is calculated based on the four Gb pixels of the 3×3 pixel block 21 shown in FIG. 1A.

In this case, in the coordinates in which the horizontal right direction is x and the vertical downward direction is y, the centroid of the Gb pixel 31 in the output image is located at the position of (x, y)=(2, 2), that is, the position of the Gb pixel 31 shown in FIG. 1B.

The pixel value of a B pixel 32 shown in FIG. 1B is calculated based on four B pixels of a 3×3 pixel block 22 shown in FIG. 1A.

In this case, the centroid of the B pixel 32 in the output image is located at the position of (x, y)=(3, 2), that is, the position of the B pixel 32 shown in FIG. 1B.

Likewise, the pixel value of a Gb pixel 33 shown in FIG. 1B is calculated based on four Gb pixels of a 3×3 pixel block 23 shown in FIG. 1A.

In this case, the centroid of the Gb pixel 33 in the output image is located at the position of (x, y)=(6, 2), that is, the position of the Gb pixel 33 shown in FIG. 1B.

Likewise, the pixel value of a B pixel 34 shown in FIG. 1B is calculated based on four B pixels of a 3×3 pixel block 24 shown in FIG. 1A.

In this case, the centroid of the B pixel 34 in the output image is located at the position of (x, y)=(7, 2), that is, the position of the B pixel 34 shown in FIG. 1B.

A total of sixteen pixels shown in FIG. 1B are output as an image with 4×4 pixels, when the sixteen pixels are set to an image.

That is, the sixteen pixels are output an image 70 with 4×4 pixels, as shown in FIG. 2B.

FIG. 2A shows the pixel centroids (as in FIG. 1B) of the output pixels. FIG. 2B shows the pixels positions of the output image.

In FIG. 2B, it is considered that a 2×2 pixel block including 2×2 pixels on the left upper side, that is, the Gb pixel 31 and the B pixel 32 is fixed. In this set example, the other three 2×2 pixel blocks are all moved in arrows (a), (β), and (γ) shown in FIG. 2B, and are output as the constituent pixels of the 4×4 pixel image 70 shown in FIG. 2B.

The following problem arises due to this shift process.

For example, the Gb pixel 33 in which the pixel centroid is located at the position of (x, y)=(6, 2) is set as a Gb pixel 53 of which the pixel position is (x, y)=(3, 2) in the output image.

Further, the B pixel 34 in which the pixel centroid is located at the position of (x, y)=(7, 2) is set as a B pixel 54 at the pixel position (x, y)=(3, 3) in the output image.

Here, a reduction ratio is calculated.

The Gb pixel 31 at the pixel position (x, y)=(2, 2) is assumed to be a reference pixel located at a fixed position.

The Gb pixel 33 at the pixel position (x, y)=(6, 2) shown in FIG. 2A is distant by four pixels from the Gb pixel 31 serving as the reference pixel.

In the output image, since the Gb pixel 33 is set as the Gb pixel 53 located at the pixel position (x, y)=(3, 2), the distance between Gb pixel 53 and the Gb pixel 31 serving the reference pixel is two pixels.

That is, the reduction ratio is 2 pixels/4 pixels=1/2.

On the other hand, the B pixel 34 at the pixel position (x, y)=(7, 2) shown in FIG. 2A is distant by five pixels from the Gb pixel 31 serving as the reference pixel.

In the output image, since the B pixel 34 is set as the B pixel 54 located at the pixel position (x, y)=(4, 2), the distance between the B pixel 54 and the Gb pixel 31 serving the reference pixel is three pixels.

That is, the reduction ratio is 3 pixels/5 pixels=3/5.

For this reason, the reduction ratios between the pixels are disperse, and thus the output image may be created which has a relative position different from the relative position of each pixel of the captured image corresponding to the pixel arrangement of the imaging element.

That is, the output may be created in which the distances between the pixels of an original image captured by the imaging element are reduced unevenly.

The uneven distances between the pixels may cause deterioration in image quality.

Specifically, for example, as shown in FIG. 3, jaggies are expanded, thereby causing the deterioration.

An original image shown in part (A) of FIG. 3 is a high-resolution image having the large number of pixels and corresponding to an image captured by the imaging element. In this image, the jaggies are small.

When the original image shown in part (A) of FIG. 3 is subjected to the pixel number reducing process by which the relative pixel positions are dispersed, as described with reference to FIGS. 1A and 1B and 2A and 2B, an image in which the jaggies are expanded may be created, as shown in part (B) of FIG. 3.

Further, the jaggies are a kind of aliasing noise. The jaggies further deteriorate due to the uneven distances between the pixel centroids after the addition calculation.

Further, the position relationship between RGB color combinations may be irregular, and thus the colors of an output image may be different from those of an original image. In this way, various deteriorations in image quality occur.

The image processing apparatus according to the embodiments of the present disclosure realizes a process of suppressing jaggies from being generated due to reduction in the number of pixels.

2. Example of Configuration of Image Processing Apparatus

The configuration of an imaging apparatus which is an example of an image processing apparatus according to the embodiments of the present disclosure will be described with reference to FIG. 4.

FIG. 4 is a block diagram illustrating an example of the imaging apparatus. Light passing through an optical lens 101 is incident on an imaging element 102 configured by, for example, a CMOS imaging sensor and image data is output by photoelectric conversion. The output image data is input to a signal processing unit 103. The signal processing unit 103 performs signal processing, such as white balance (WB) adjustment, gamma adjustment, or demosaic processing for a general camera.

Further, the signal processing unit 103 performs a pixel number reducing process and an image correcting process of realizing the reduction in jaggies to generate an output image 120. The output image 120 is stored in a storage unit (not shown). Alternatively, the output image 120 is output to a display unit.

A control unit 105 outputs a control signal to each unit in accordance with a program stored in a memory (not shown) and controls various kinds of processes.

3. Overview of Process of Signal Processing Unit

As described above, the signal processing unit 103 performs not only perform signal processing of a general camera but also the pixel number reducing process and the image correcting process of realizing the reduction in the jaggies.

The overview of the processes will be described with reference to FIG. 5.

Figure 5:
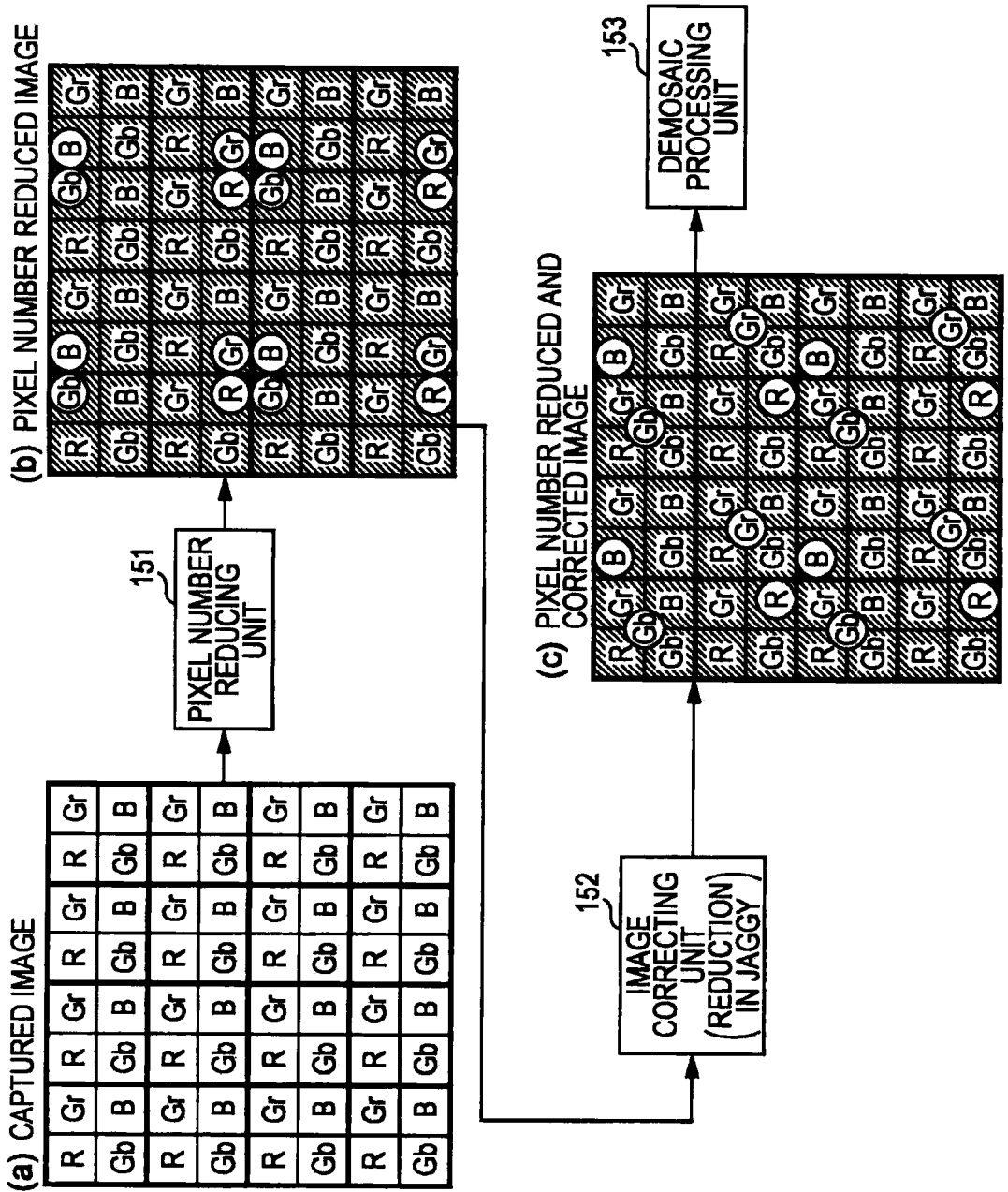
FIG. 5 is a diagram illustrating the overview of a process performed by the image processing apparatus.

FIG. 5 shows three pieces of image data as follows:
part (a) a captured image,
part (b) a pixel number reduced image; and
part (c) a pixel number reduced and corrected image.

The signal processing unit 103 includes a pixel number reducing unit 151, an image correcting unit 152, a demosaic processing unit 153, as shown in FIG. 5.

The (a) captured image is an image that the imaging element 102 captures and is image data in which the pixel value is set in a pixel unit of the imaging element 102.

In this embodiment, a processing example of the output of the imaging element having the Bayer arrangement (RGrGbB) will be described.

In the (b) pixel number reduced image shown in FIG. 5, the positions of the pixel centroids of the pixels of the image obtained by reducing the number of pixels of the (a) captured image to 1/4 of the number of pixels are shown. The pixels of the pixel number reduced image are each indicated by a circular frame.

The pixel centroids of the pixel number reduced image are located at given positions in the original (a) captured image.

The pixel number reducing unit 151 inputs the (a) captured image and performs an addition averaging process on the pixel values of, for example, four Gb pixels to calculate the pixel value of a single Gb pixel. The pixel number reducing unit 151 first performs the addition averaging process on the pixel values of the Gb pixels located at the four vertexes of the same 3×3 pixel block as the pixel block described above with reference to FIGS. 1A and 1B.

The pixel number reducing unit 151 calculates a single output pixel value from the four pixel values of all the R, Gr, Gb, and B pixels and creates the (b) pixel number reduced image in which the number of pixels is reduced to 1/4.

This process is the same as the pixel number reducing process described above with reference to FIGS. 1A and 1B and 2A and 2B according to the related art.

The pixel positions of the R, Gr, Gb, and B pixels indicated by the circular frame in the (b) pixel number reduced image are the pixel positions of the pixel centroids described with reference to FIG. 1B.

When the output image is created in this way, the output image may be an image in which the jaggies described with reference to FIGS. 2A, 2B, and 3 are generated.

Accordingly, in the image processing apparatus according to this embodiment, the pixel number reduced image shown in part (b) of FIG. 5 is input to the image correcting unit 152 of the signal processing unit 103 and an image correcting process is performed to move the pixel centroids.

The pixel number reduced and corrected image shown in part (c) of FIG. 5 is created through the image correcting process by the image correcting unit 152.

The pixel number reduced image shown in part (b) of FIG. 5 is different from the pixel number reduced and corrected image shown in part (c) of FIG. 5 in that the positions of the pixel centroids of the Gb and Gr pixels are moved.

In this way, the image processing apparatus according to this embodiment performs the process of moving the pixel centroids of the Gb and Gr pixels.

In the pixel number reduced and corrected image shown in part (c) of FIG. 5, the relative position of each color signal is set to be substantially the same as in the captured image through the process of moving the pixel centroids. That is, the relative position of each color (RGrGbB) in the pixel number reduced and corrected image can be set to substantially the same as the relative position of each color in the (a) captured image which is the original image.

In the embodiment described below, the process is performed only on the G pixels (Gr and Gb) in the Bayer arrangement of the RGrGbB pixel structure. The ratio of the G pixels to the pixels of the entire image is high. Therefore, even when the process is performed only on the G pixels, it is possible to obtain the sufficient jaggies reduction advantage. As the processing result, since the jaggies are suppressed from being generated, as described above with reference to FIG. 3, it is possible to create the pixel number reduced and corrected image with high quality.

The demosaic processing unit 153 performs a demosaic process based on the pixel number reduced and corrected image shown in part (c) of FIG. 5 to create image data in which all color information (RGrGbB) is set in each pixel.

4. Process of Image Correction Unit

Hereinafter, the image correcting process performed by the image processing apparatus according to the embodiment of the present disclosure in which the jaggies reduction advantage is obtained, that is, the process performed by the image correcting unit 152 shown in FIG. 5 will be described.

As described above with reference to FIG. 5, the image correcting unit 152 performs the process of correcting the pixel number reduced image shown in part (b) of FIG. 5, which is the raw image created through a pixel adding process or a pixel thinning process. Here, the raw image refers to an image which is not subjected to a demosaic process and in which only one pixel value is set in each pixel.

The image correcting unit 152 reduces the jaggies caused due to the deviation in the pixel centroids, which may not scarcely be corrected in the related art, by adjusting the centroid deviation.

Specifically, the process performed by the image correcting unit 152 includes four processes, that is, the first process to the fourth process described below:

(First Process) a process of calculating the edge strengths ($D_H$, $D_V$, $D_R$, and $D_L$) of a total of four directions, that is, the horizontal (H), vertical (V), right upper (R), and left upper (L) directions using the G components of the pixel number reduced image (raw image);

(Second Process) a process of calculating smoothing G components ($G_H$, $G_V$, $G_R$, and $G_L$) of a total of four directions, that is, the horizontal (H), vertical (V), right upper (R), and left upper (L) directions;

(Third process) a process of calculating weights ($W_H$, $W_V$, $W_R$, and $W_L$) to be multiplied to the smoothing G components ($G_H$, $G_V$, $G_R$, and $G_L$) of the horizontal (H), vertical (V), right upper (R), and left upper (L) directions calculated through the second process in accordance with the edge strengths ($D_H$, $D_V$, $D_R$, and $D_L$) of the four directions calculated through the first process; and (Fourth process) a process of calculating the output pixel values by a blending process of multiplying the smoothing G components ($G_H$, $G_V$, $G_R$, and $G_L$) of the horizontal (H), vertical (V), right upper (R), and left upper (L) directions calculated through the second process by the weights ($W_H$, $W_V$, $W_R$, and $W_L$) calculated through the third process.

Hereinafter, each of the processes (the first to fourth processes) will be described in sequence.

4-1. (First Process) Process of Calculating Edge Strengths ($D_H$, $D_V$, $D_R$, and $D_L$) of Total of Four Directions, that is, Horizontal (H), Vertical (V), Right Upper (R), and Left Upper (L) Directions Using G Components of Pixel Number Reduced Image (Raw Image)

First, the first process, that is, the process of calculating the edge strengths ($D_H$, $D_V$, $D_R$, and $D_L$) of a total of four directions, that is, the horizontal (H), vertical (V), right upper (R), and left upper (L) directions using the G components of the pixel number reduced image (raw image) will be described.

The image correcting unit 152 inputs the pixel number reduced image (raw image) shown in part (b) of FIG. 5 and performs a process of calculating the edge strengths ($D_H$, $D_V$, $D_R$, and $D_L$) of a total of four directions, that is, the horizontal (H), vertical (V), right upper (R), and left upper (L) directions using the pixel values of the G (Gr and Gb) pixels among the pixels included in the input pixel number reduced image.

In the embodiment described below, a processing example will be described in which both the image captured by the imaging element 102 and the pixel number reduced image created by the signal processing unit have the Bayer arrangement of RGrGbB.

The image correcting unit 152 calculates the Laplacian absolute value corresponding to the absolute value of a secondary differential value of a pixel value using the pixel values of the G (Gr and Gb) pixels included in the Bayer arrangement that the pixel number reduced image has.

Further, the image correcting unit 152 calculates the weighted mean of the Laplacian absolute values of the pixel values of the G (Gr and Gb) positions in a preset edge strength calculation region and calculates the edge strength at each region.

Hereinafter, a specific example of calculating the Laplacian absolute value of the pixel values of the G (Gr and Gb) pixels of a total of four directions, that is, the horizontal (H) (=lateral), vertical (V) (=longitudinal), right upper (R), and left upper (L) directions will be described.

a. Process of Calculating Laplacian Absolute Value of Horizontal (H) (=Lateral) and Vertical (V) (=Longitudinal) Directions First, the process of calculating the Laplacian absolute value of the horizontal (H) (=lateral) and vertical (V) (=longitudinal) directions will be described with reference to FIGS. 6 and 7.

Now, the process of calculating the Laplacian absolute value in the horizontal (H) (=lateral) will be described with reference to FIG. 6.

Figure 6:
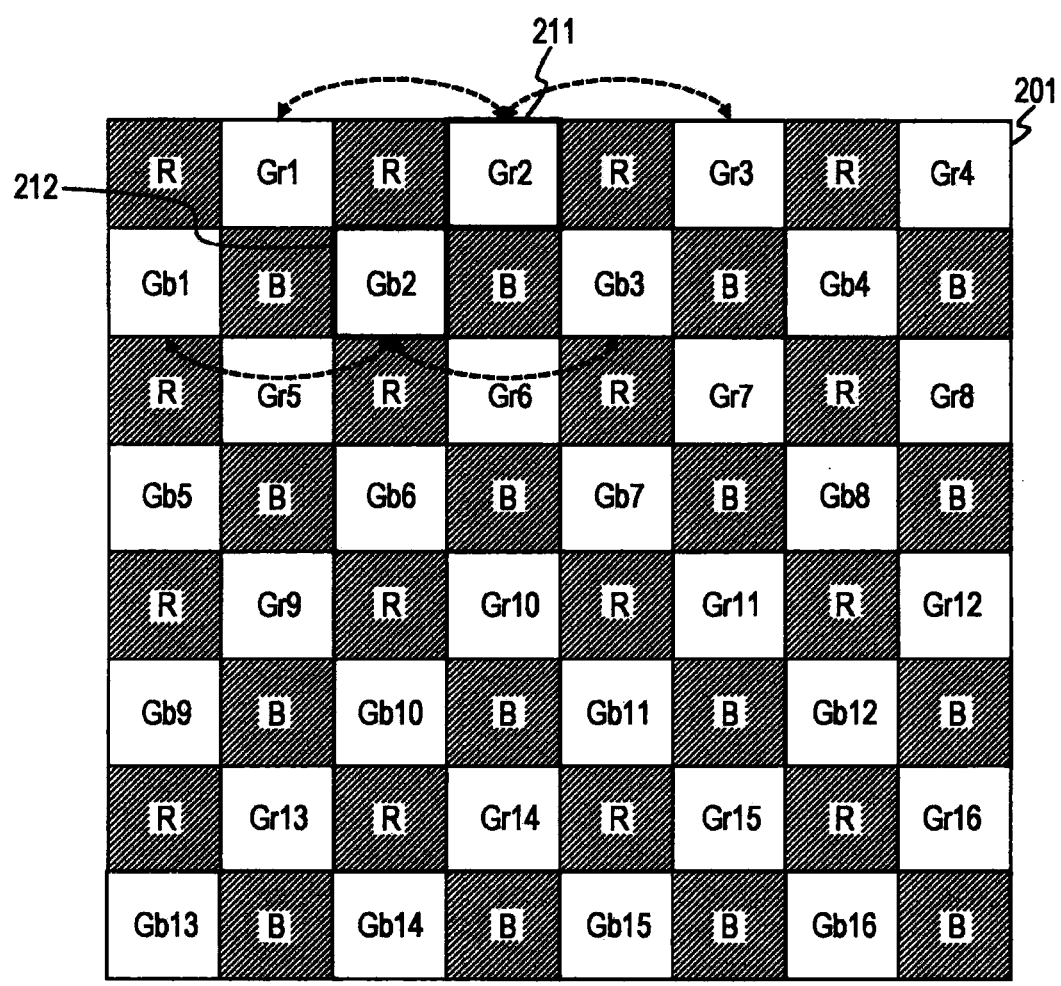
FIG. 6 is a diagram illustrating a process of calculating a Laplacian absolute value of a horizontal (H) (=lateral) direction.

An image shown in FIG. 6 is a pixel number reduced image 201 (raw image) corresponding to the pixel number reduced image shown in part (b) of FIG. 5. The pixel number reduced image shown in part (b) of FIG. 5 is an image in which the positions of the pixel centroids of the pixel number reduced image are shown in the pixel arrangement of the original captured image, but the pixel number reduced image 201 shown in FIG. 6 corresponds to a pixel number reduced image created by integrating the pixels distant from each other, which are shown in part (b) of FIG. 5. That is, the pixel number reduced image 201 is the pixel number reduced image (raw image) created by setting the pixel positions described above with reference to FIG. 2B.

The pixel number reduced image 201 shown in FIG. 6 is an image in which there is a concern that the jaggies described above with reference to FIG. 3 may be generated since the relative positions of the pixel centroids of the respective colors are deviated from the relative positions of the pixel centroids of the respective colors in the pixel arrangement of the original captured image.

The pixel number reduced image 201 shown in FIG. 6 has the Bayer arrangement. Therefore, the G (Gr or Gb) pixel appears in both the horizontal (H) (=lateral) direction and the vertical (V) (=longitudinal) direction every two pixels. The Laplacian absolute value is calculated using the G components.

A method of calculating the Laplacian absolute value of the horizontal (H) (=lateral) direction will be described.

As one example, a case will be described in which the Laplacian absolute value $L_{Gr2\_H}$ of the horizontal (H) (lateral) direction is calculated at the position of a pixel Gr2 211 in the image 201 shown in FIG. 6.

When the image correcting unit 152 calculates the Laplacian absolute value $L_{Gr2\_H}$ of the horizontal (H) (lateral) direction at the position of the pixel Gr2 211 in the image 201 shown in FIG. 6, the image correcting unit 152 performs calculation using the pixel values of the pixels Gr1 and Gr3 distant from the pixel Gr2 211 by one pixel in the horizontal (H) (=lateral) direction by an equation (Equation 1).

$$L_{Gr2\_H}=|Gr_1-2Gr_2+Gr_3| \quad \text{(Equation 1)}$$

In this equation, $L_{Gr2\_H}$ is the Laplacian absolute value of the horizontal (H) (=lateral) direction at the position of the pixel Gr2, Gr1 is the pixel value of the pixel Gr1 at the position distant from the pixel Gr2 by one pixel in the lateral direction, Gr2 is the pixel value of the pixel Gr2, and Gr3 is the pixel value of the pixel Gr3 at the position distant from the pixel Gr2 by one pixel in the lateral direction.

The image correcting unit 152 calculates the Laplacian absolute values of the lateral direction at the pixel positions of the G components, that is, the pixels. Gr and Gb included in the pixel number reduced image 201 by the equation (Equation 1) above.

For example, when the Laplacian absolute value $L_{Gb2\_H}$ of the horizontal (H) (=lateral) direction is calculated at the position of a pixel Gb2 212 shown in FIG. 6, calculation is performed using the pixel values of pixels Gb1 and Gb3 at the positions distant from the pixel Gb2 212 by one pixel in the lateral direction by the equation (Equation 1) above.

In the equation (Equation 1) above, Gr1, Gr2, and Gr3 are substituted by Gb1, Gb2, and Gb3, respectively, and the Laplacian absolute value $L_{Gb2\_H}$ of the horizontal (H) (=lateral) direction is calculated at the position of a pixel Gb2 212.

The Laplacian absolute values of the vertical (V) (=longitudinal) direction are also calculated using the G components distant by one pixel in the longitudinal direction.

Figure 7:
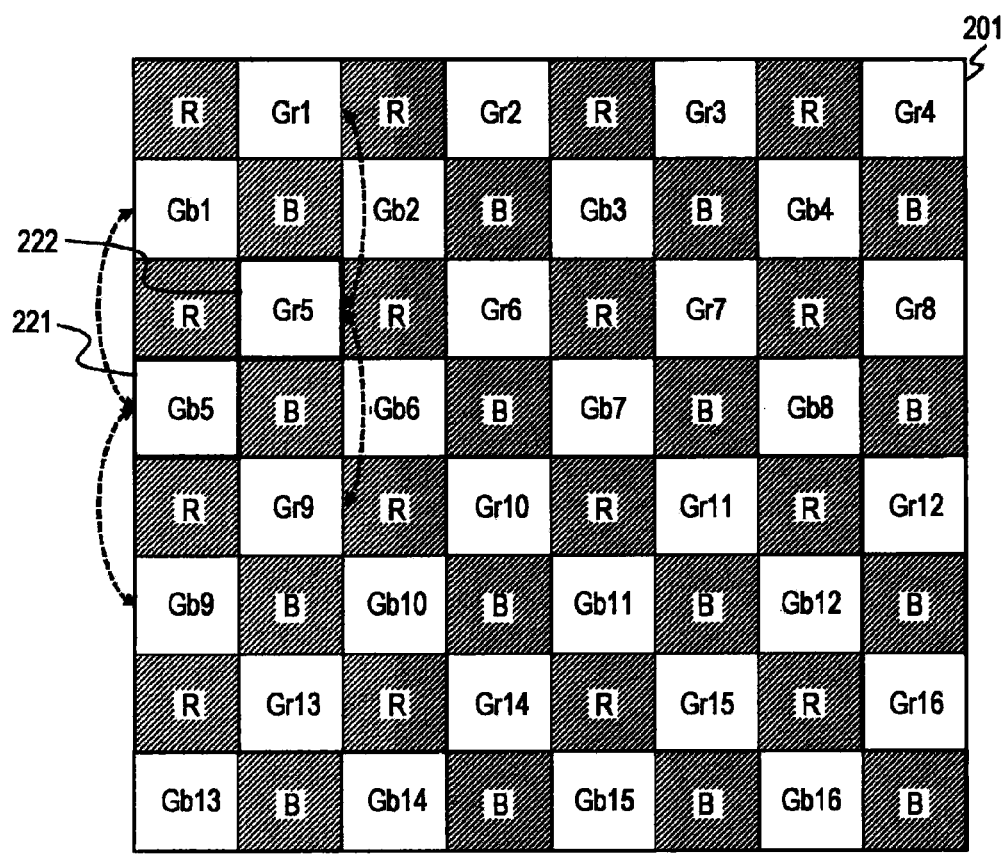
FIG. 7 is a diagram illustrating a process of calculating a Laplacian absolute value of a vertical (V) (=longitudinal) direction.

For example, when the Laplacian absolute value $L_{Gb5\_V}$ of the vertical (V) (=longitudinal) direction is calculated at the position of a pixel Gb5 221 shown in FIG. 7, calculation is performed using the pixel values of pixels Gb1 and Gb9 at the positions distant from the pixel Gb5 221 by one pixel in the longitudinal direction by the equation (Equation 1) above.

In the equation (Equation 1) above, Gr1, Gr2, and Gr3 are substituted by Gb5, Gb1, and Gb9, respectively, and the Laplacian absolute value $L_{Gb5\_V}$ of the vertical (V) (=longitudinal) direction is calculated at the position of the pixel Gb5 221.

For example, when the Laplacian absolute value $L_{Gr5\_V}$ of the vertical (V) (=longitudinal) direction is calculated at the position of a pixel Gr5 222 shown in FIG. 7, calculation is performed using the pixel values of pixels Gr1 and Gr9 at the positions distant from the pixel Gr5 222 by one pixel in the longitudinal direction by the equation (Equation 1) above.

In the equation (Equation 1) above, Gr1, Gr2, and Gr3 are substituted by Gr5, Gr1, and Gr9, respectively, and the Laplacian absolute value $L_{Gr5\_V}$ of the vertical (V) (=longitudinal) direction is calculated at the position of the pixel Gr5 222.

b. Process of Calculating Laplacian Absolute Value of Right Upper (R) and Left Upper (L) Directions Next, the process of calculating the Laplacian absolute values of the right upper inclination direction and the left upper inclination direction, that is, the right upper (R) direction and the left upper (L) direction will be described with reference to FIGS. 8 and 9.

The Laplacian absolute value is calculated using an object G pixel in the inclination direction and three G pixels adjacent in the inclination direction.

Figure 8:
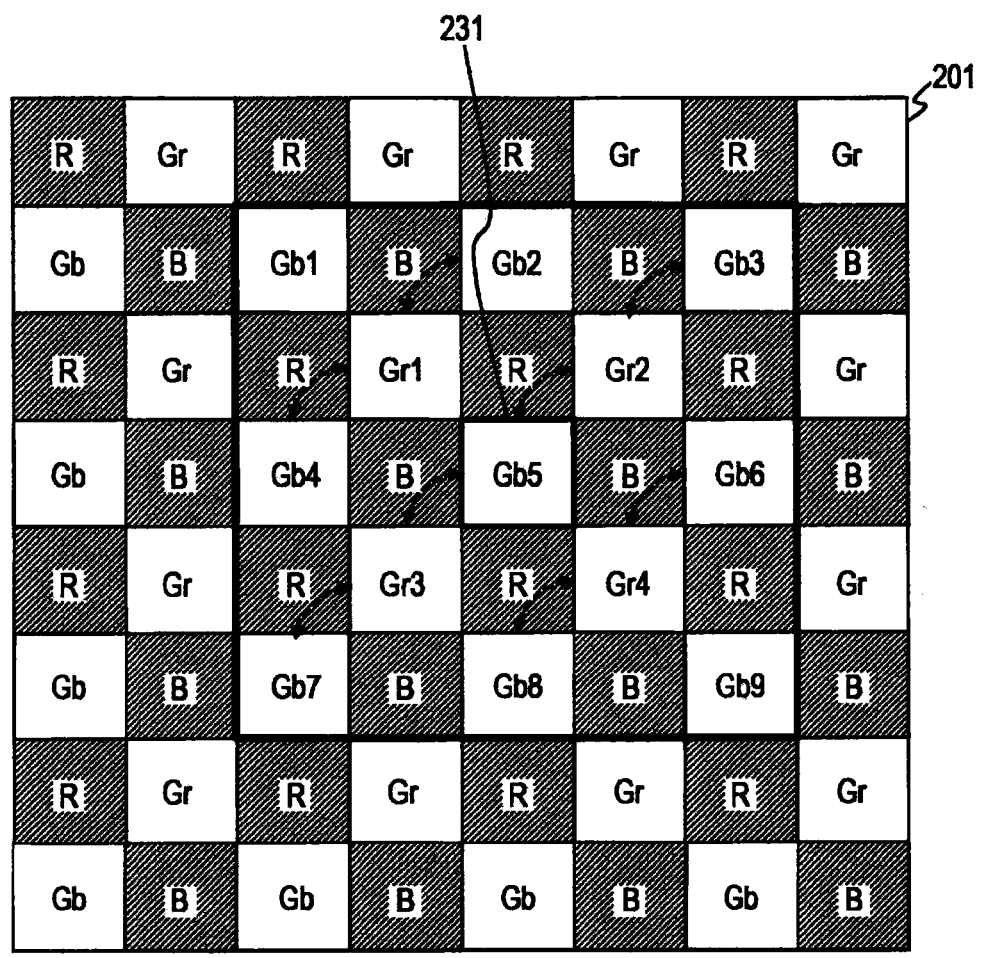
FIG. 8 is a diagram illustrating a process of calculating a Laplacian absolute value of a right upper (R) direction.

The process of calculating the Laplacian absolute value of the right upper (R) direction will be described with reference to FIG. 8.

For example, when the Laplacian absolute value $L_{Gb5\_R}$ of the right upper (R) direction is calculated at the position of a pixel Gb5 231 shown in FIG. 8, calculation is performed using the pixel value of the pixel Gb5 and the pixel values of a pixel Gr2 at the right upper position and a pixel Gr3 at the left lower position, which are the G component pixels appearing in the right upper inclination direction, by the equation (Equation 2) below.

$$L_{Gb5\_R}=|Gr_2-2Gb_5+Gr_3| \quad \text{(Equation 2)}$$

In this equation, $L_{Gb5\_R}$ is the Laplacian absolute value of the right upper (R) direction at the position of the pixel Gb5, Gr2 is the pixel value of the pixel Gr2 at the right upper position of the pixel Gb5, Gb5 is the pixel value of the pixel Gb2, and Gr3 is the pixel value of the pixel Gr3 at the left lower position of the pixel Gb5.

The Laplacian absolute value of the left upper (L) direction is also calculated by a calculation equation such as the equation (Equation 2) above.

Figure 9:
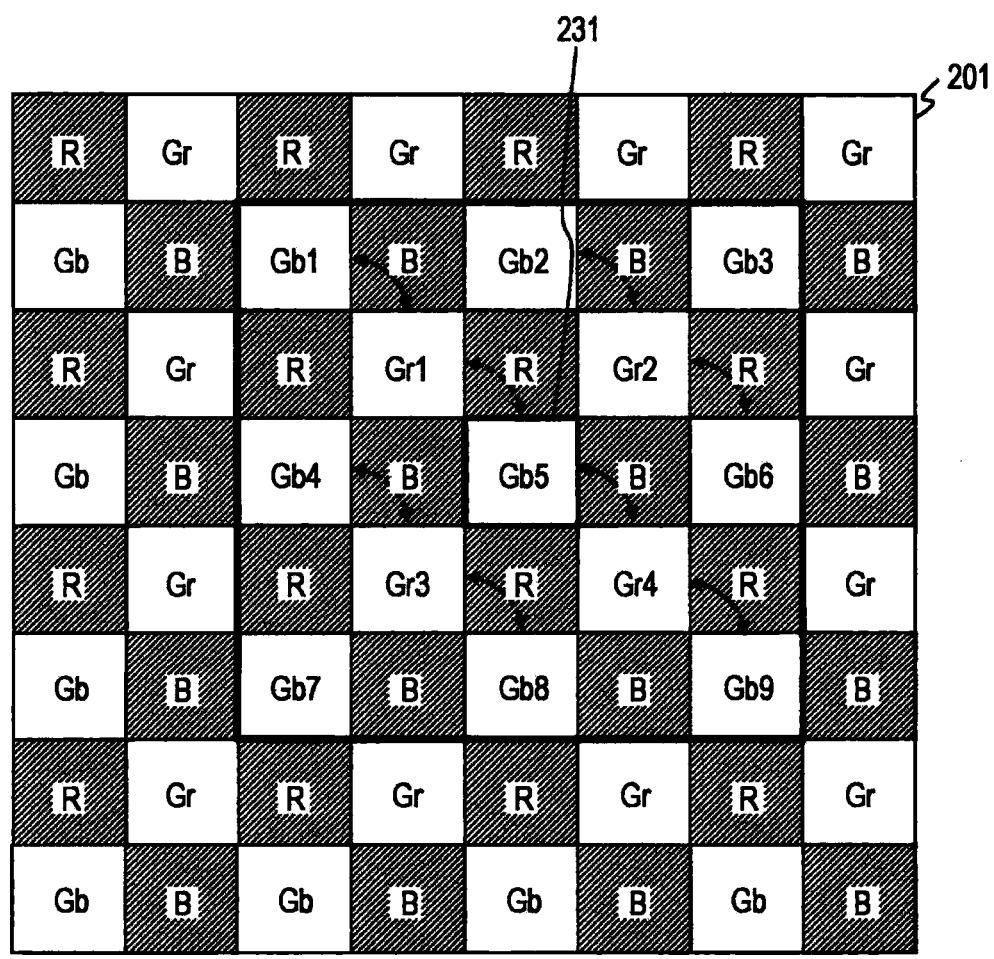
FIG. 9 is a diagram illustrating a process of calculating a Laplacian absolute value of a left upper (L) direction.

For example, when the Laplacian absolute value $L_{Gb5\_L}$ of the left upper (R) direction is calculated at the position of a pixel Gb5 231 shown in FIG. 9, calculation is performed using the pixel value of the pixel Gb5 and the pixel values of a pixel Gr1 at the left upper position and a pixel Gr4 at the right lower position, which are the G component pixels appearing in the left upper (L) inclination direction, by the equation (Equation 2) above.

In Equation 2, Gr1 and Gr4 are used instead of Gr2 and Gr3.

An image in which the Laplacian absolute value is to be calculated by the image correcting unit 152 is the pixel number reduced image shown in part (b) of FIG. 5, as described above with reference to FIG. 5. The pixel number reduced image is an image obtained by reducing the number of pixels of the original (a) captured image by a pixel adding process or a pixel thinning process. In the pixel number reduced image, the deviation in the pixel centroids may occur in some cases, as described above with reference to FIGS. 2A and 2B.

The Laplacian absolute value calculated based on the (b) pixel number reduced image in which the deviation in the pixel centroids occurs is different from the Laplacian absolute value calculated based on the (a) captured image which is the original image. That is, the Laplacian absolute value of a direction deviated from an angle desired to be calculated is calculated. However, the error is the maximum 10% or less. It has quantitatively been verified that there is no influence when the ratios of the strengths of four directions are calculated.

The image correcting unit 152 calculates four Laplacian absolute values:

(1) a Laplacian absolute value of the horizontal (H) direction;

(2) a Laplacian absolute value of the vertical (V) direction;

(3) a Laplacian absolute value of the right upper (R) direction; and (4) a Laplacian absolute value of the left upper (L) direction.

In this way, the image correcting unit 152 calculates the Laplacian absolute value in each direction using the G components (Gr and Gb) included in the pixel number reduced image.

Next, the image correcting unit 152 calculates an edge strength by calculating the weighted mean of the Laplacian absolute values at the G positions.

The weighted mean value of the Laplacian absolute values is calculated by performing a process of performing a weighted averaging process, that is, a process of calculating the weighted mean value of the Laplacian absolute values calculated at all of the G positions present in an N×N pixels in which a pixel which is an edge strength calculation object serves as the center pixel.

A large weight is given to the Laplacian absolute value of the center pixel corresponding to the pixel which is an edge strength calculation object and a small weight is given to the peripheral pixels.

Figure 10:
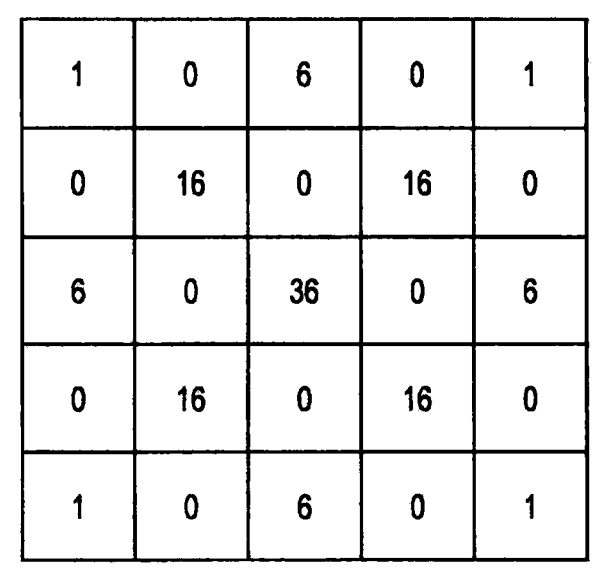

FIG. 10 shows a setting example of the weights. In the example shown in FIG. 10, the weights are set in a region of N×N=5×5 pixels.

In the example shown in FIG. 10, the weights are set as follows.

A weight 36 is set to a G pixel (Gr or Gb) which is the edge strength calculation object, a weight 16 is given to four peripheral G (Gr or Gb) pixels, a weight 6 is set to four peripheral G (Gr or Gb) pixels in the horizontal and vertical directions, and a weight 1 is set to four G (Gr or Gb) pixels in the inclination directions.

The image correcting unit 152 calculates the weight mean of the Laplacian absolute values calculated at the respective G positions using the weights and calculates the weighted mean value of the Laplacian absolute value indicating the edge strength of the G pixel at the central position. Further, it is necessary to perform normalization so that the sum of the weights becomes 1 at the actual calculation.

The image correcting unit 152 calculates the following values in a unit of the G pixels (Gr and Gb) of the pixel number reduced image through the above-described process:

(1) $D_H$: a horizontal direction Laplacian value sum (weighted mean) of the Laplacian absolute values of the horizontal (H) direction;

(2) $D_V$: a vertical direction Laplacian value sum (weighted mean) of the Laplacian absolute values of the vertical (V) direction;

(3) $D_R$: a right upper direction Laplacian value sum (weighted mean) of the Laplacian absolute values of the right upper (R) direction; and (4) $D_L$: a left upper direction Laplacian value sum (weighted mean) of the Laplacian absolute values of the left upper (L) direction.

4-2. (Second Process) Process of Calculating Smoothing G components ($G_H$, $G_V$, $G_R$, and $G_L$) of Total of Four Directions, that is, Horizontal (H), Vertical (V), Right Upper (R), and Left Upper (L) Directions Next, the second process, that is, the process of calculating the smoothing G components ($G_H$, $G_V$, $G_R$, and $G_L$) of a total of four directions, that is, the horizontal (H), vertical (V), right upper (R), and left upper (L) directions will be described.

In this method, an interpolating process is realized to suppress deterioration in a resolution by actively using the deviation in the pixel centroids by pixel addition. First, the deviation in the pixel centroids occurring due to the pixel adding process will be described, and then a specific calculation example of the smoothing G components ($G_H$, $G_V$, $G_R$, and $G_L$) corresponding to two kinds of pixel adding processes will be described.

For example, the pixel adding process is realized by a re-sampling process on an analog output signal of charges accumulated in each pixel of the imaging element (imaging sensor) 102 when an imaging process is performed. Specifically, an output circuit of each pixel of the imaging element 102 is realized by setting output addition structure of two pixels.

For example, there is provided a method of adding four pixels with the same color adjacent to each other in the horizontal and vertical directions of the imaging element (imaging sensor) 102 at a ratio of 1:1 or performing weighted addition only in the horizontal direction.

An example of the pixel adding process will be described with reference to FIGS. 11A and 11B.

Figure 11B:
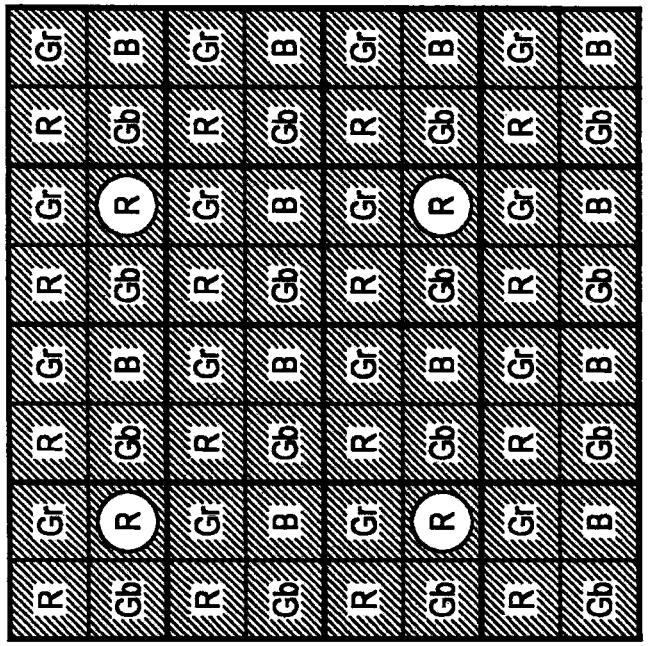
FIGS. 11A and 11B are diagrams illustrating an example of a pixel adding process.
Figure 11A:
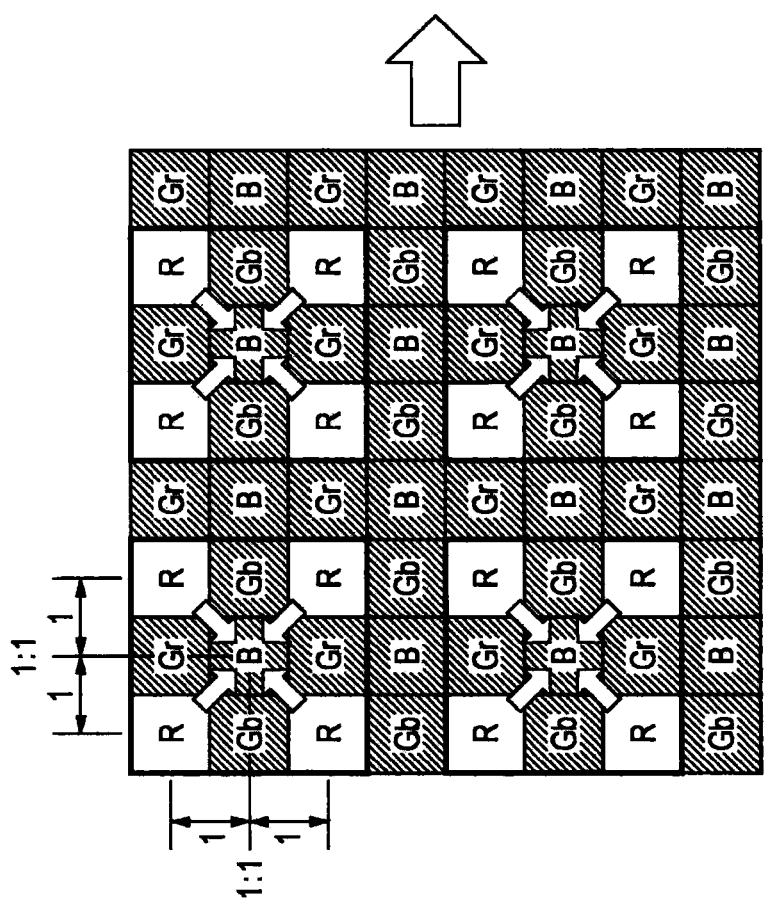

FIGS. 11A and 11B show the example of the pixel adding process on the pixels with the same color included in a 3×3 pixel block of the imaging element (imaging sensor) 102.

FIGS. 11A and 11B show the sample of the process of evenly calculating the pixel values of four R pixels included in the 3×3 pixel block, calculating the average value of the pixel values, and calculating the output pixel value (R pixel value) of the pixel number reduced image. FIG. 11A shows an example of the pixel adding process (in a case of the R pixels) of a captured image. FIG. 11B shows the pixel centroids (in the case of the R pixels) of the pixel number reduced image subjected to the pixel adding process.

The example of the process shown in FIGS. 11A and 11B is a process of setting the pixel value of a single pixel in the pixel number reduced image based on the pixel values of four pixels with the same color and is a process of generating the pixel number reduced image obtained by reducing the number of pixels to 1/4 of the total number of pixels of the original captured image by the imaging element.

FIGS. 11A and 11B show the example of the process of evenly adding the pixel values of the four pixels, that is, the pixel adding process in horizontal 1:1 and vertical 1:1 setting.

In FIG. 11B, the pixel centroid (in the case of the R pixel) of the pixel number reduced image subjected to the pixel adding process indicates the pixel centroid of the R pixel in the pixel number reduced image. An R portion indicated by a circle represents the center position.

The centroids of the R pixels are not located at the center of a block of a 4-pixel unit, but are located at a position biased in the right lower direction of the block of the 4-pixel unit. The process described in FIGS. 11A and 11B is the pixel number reducing process of reducing the number of pixels to 1/4. The pixel centroid is preferably set at the center position of the block of the 4-pixel unit.

That is, when the pixel centroid of each pixel of the pixel number reduced image is set at the center position of the block of the 4-pixel unit, the pixel number reduced image having the same relative position as the relative position of each color of the captured image before the reduction in the number of pixels is generated. Therefore, it is possible to suppress the jaggies from being generated due to the deviation in the pixel centroids, as described above with reference to FIG. 1A to 3.

The deviation in the pixel centroids shown in FIG. 11B occurs in the same process as the process described above with reference to FIGS. 1A to 3, and the jaggies may be generated.

That is, since a simple re-sampling effect and the deviation in the pixel centroid occur in such a plain pixel adding process, the jaggies may be generated.

Originally, the deviation in the pixel centroids simply causes the deterioration in the image quality. However, by actively using the deviation in the pixel centroids in this method, it is possible to realize the reduction in the jaggies, thus realize the reduction in the resolution deterioration, compared to the method according to the related art.

The overview of a process of reducing the jaggies will be described.

When the pixel value of a single pixel of the pixel number reduced image is calculated by performing the pixel adding process using four pixels with the same color and the pixel adding process at the horizontal 1:1 and vertical 1:1 ratios, that is, the process of evenly adding the pixel values of the four pixels, as shown in FIG. 11A, the pixel centroids shown in FIG. 11B are set. As a consequence, the jaggies occur due to the deviation in the pixel centroids.

In order to resolve this problem, for example, a pixel adding process of setting the addition ratios of both horizontal and vertical directions to 1:3 may be performed, as shown in FIGS. 12A and 12B.

The pixel adding process shown in FIGS. 12A and 12B is an example of a process of calculating the pixel value of a single pixel of the pixel number reduced image based on the pixel values of four pixels with the same color included in a 3×3 pixel block, as in FIGS. 11A and 11B.

FIG. 12A shows an example of the pixel adding process (in a case of a Gr pixel). FIG. 12B shows the pixel centroids (in the case of Gr pixels) in the pixel number reduced image subjected to the pixel adding process.

In FIG. 12B, the pixel centroid (in the case of the Gr pixel) of the pixel number reduced image subjected to the pixel adding process indicates the pixel centroid of the Gr pixel in the pixel number reduced image. A Gr portion indicated by a circle (○) represents the centroid position.

The example shown in FIG. 12B is different from the example shown in FIG. 11B. That is, the pixel centroid of the Gr pixel is set at the center position of the block of the 4-pixel unit. The process described in FIGS. 12A and 12B is the pixel number reducing process of reducing the number of pixels to 1/4. The pixel centroid is preferably set at the central position of the block of the 4-pixel unit.

That is, when the pixel centroid of each pixel of the pixel number reduced image is set at the center position of the block of the 4-pixel unit, the pixel number reduced image having the same relative position as the relative position of each color of the captured image before the reduction in the number of pixels is generated. Therefore, it is possible to suppress the jaggies from being generated due to the deviation in the pixel centroids, as described above with reference to FIG. 1A to 3.

In this way, by performing the pixel adding process in which the addition ratios of the pixel values are changed, it is possible to move the pixel centroids of the pixels of the pixel number reduced image. As a consequence, it is possible to suppress the jaggies from being generated.

The process on the Gr pixels has been described in FIGS. 12A and 12B. However, the positions of the pixel centroids of the output pixels can be controlled by adjusting the addition ratios of four Gb pixels other than the Gr pixels. That is, the pixel centroid can be set at the central position of the 4-pixel block shown in FIG. 12B. As a consequence, it is possible to create the pixel number reduced image in which the jaggies are suppressed.

By arranging the pixel centroid at the central position of the four-pixel block, for example, the pixels are arranged in one line shape in an inclination direction, differently from the pixel number reduced image in which the deviation in the pixel centroids occurs. Therefore, a signal can be observed at a larger sampling interval.

For example, it is supposed that there is a pattern having a straight-line edge oriented from the right upper direction to the left lower direction. The resolution of the pattern does not deteriorate due to the characteristics of the edge, even when the smoothing process is performed along the edge. Therefore, when the Gr pixels or Gb pixels adjacent to each other in a direction parallel to the edge are smoothed, it is possible to extract a signal in which the resolution does not deteriorate in a direction perpendicular to the edge, that is, from the left upper inclination direction to the right lower inclination direction at a sampling interval larger than the resolution after the pixel adding process.

On the other hand, when the deviation in the pixel centroids does not occur, only an inclination component signal of a $\sqrt{2}$ pixel interval in the resolution after the pixel adding process can be acquired in regard to the components smoothed in an inclination direction even in a case where the Gr pixels, the Gb pixels, or both Gr and Gb pixels are used.

FIGS. 13A and 13B are diagrams illustrating an example of a difference in the sampling interval in the right upper inclination direction when the deviation in the pixel centroids occurs and when the deviation in the pixel centroids does not occur.

FIG. 13A shows an example of a sampling interval when the deviation in the pixel centroids occurs and FIG. 13B shows an example of a sampling interval when the deviation in the pixel centroids does not occur.

Both FIGS. 13A and 13B show the sampling interval (pixel interval) in the inclined line in the G pixels (Gr and Gb).

When the deviation in the pixel centroids occurs, as shown in FIG. 13A, two kinds of smoothing components, that is, a smoothed Gr line between the Gr pixels and a smoothed Gb line between the Gb pixels can be acquired.

Since the interval between the Gr line and the Gb line is denser than the sampling interval in the inclination direction of the Bayer arrangement, a signal with a higher resolution can be re-sampled from the smoothing components.

On the contrary, when the deviation in the pixel centroids does not occur, as shown in FIG. 13B, the Gr lines are identical with the Gb lines (G lines) and the interval between the G lines is the same as that of the Bayer arrangement.

The interval between the G lines shown in FIG. 13B is larger than the interval between the Gb line and Gr line shown in FIG. 13A. As a consequence, the signal with the high resolution can be re-sampled from the smoothing components in the setting of FIG. 13A.

Next, a method of calculating the smoothing components using the deviation in the pixel centroids hitherto described will be described in a specific example applied to the following pixel adding processes:

(a) horizontal 1:1 and vertical 1:1 addition (process shown in FIGS. 11A and 11B); and (b) horizontal 1:3 and vertical 1:1 addition.

(a) Interpolating Process Corresponding to Horizontal 1:1 and Vertical 1:1 Addition (Process Shown in FIGS. 11A and 11B)

First, an example of the interpolating process will be described with reference to each of FIG. 14 and the subsequent drawings, when the adding process is performed at the horizontal 1:1 and vertical 1:1 ratios described above with reference to FIGS. 11A and 11B.

When the pixel adding process at the horizontal 1:1 and vertical 1:1 ratios described above with reference to FIGS.

Figure 14:
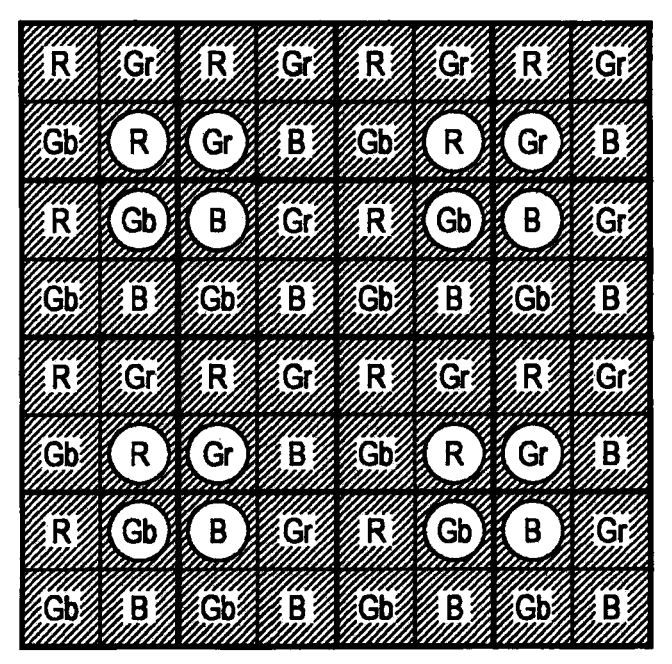

11A and 11B is performed, the centroid position of each pixel of the pixel number reduced image is set, as shown in FIG. 14.

The centroid position of each of the pixels R, Gr, Gb, and B is indicated by a circle. When the deviation in the centroid position occurs in this adding process, the signal at a large sampling interval can be interpolated in a pattern having an edge in the left upper and right lower inclination direction.

A process of calculating the smoothing G components ($G_L$) corresponding to the pattern having the edge in the left upper (L) direction will be described with reference to FIG. 15 and the subsequent drawings.

For example, the process of calculating the smoothing G components corresponding to the pattern having the edge in the left upper (L) direction is performed through two (a) and (b) processes:

(a) a process of calculating an interpolated pixel value in an edge direction (L); and (b) a re-sampling process of calculating the pixel value of an object pixel position, at which the final pixel value is set, using a plurality of pixel values such as the calculated interpolated pixel values.

First, the (a) process, that is, the process of calculating the interpolated pixel value in the edge direction (L) will be described with reference to FIG. 15.

The object pixel position at which the final pixel value is set is referred to as an object pixel position 301.

The interpolated pixel value is set on a line 302 in a direction perpendicular to the edge of the object pixel position.

Figure 15:
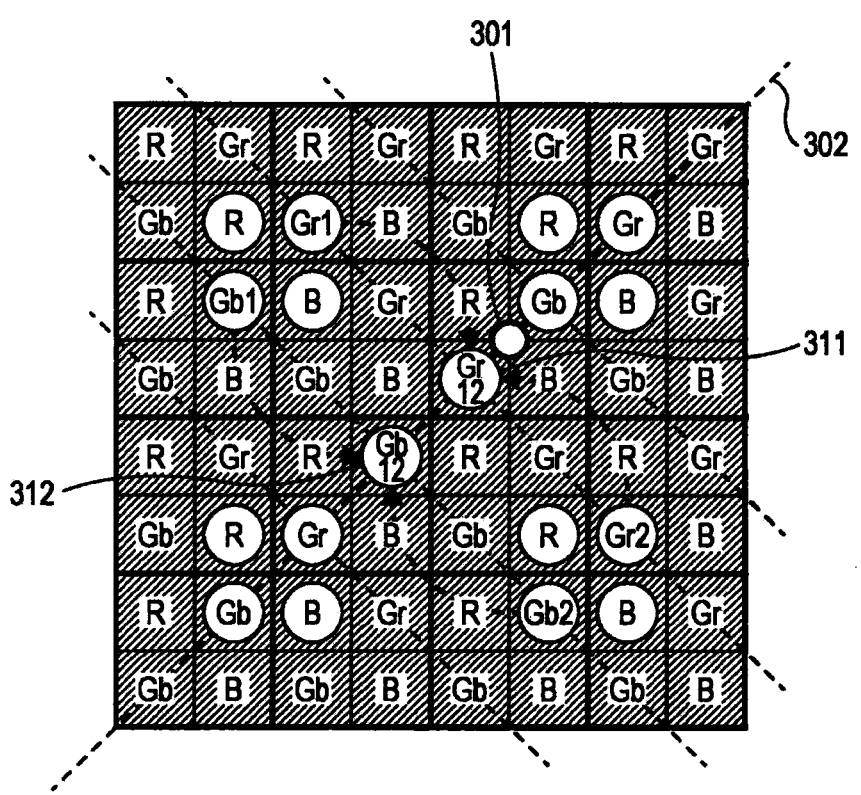
FIG. 15 is a diagram illustrating a process of calculating smoothing G components ($G_L$) corresponding to a pattern having an edge of the left upper (L) direction.

When Gr pixels Gr1 and Gr2 are interpolated in the left upper direction at a ratio of 1:1, as shown in FIG. 15, a signal (the pixel value of the interpolated pixel) subjected to the re-sampling process (interpolating process) can be calculated at the position of a pixel Gr12 311 in the drawing.

In the interpolated signal, the resolution does not deteriorate in the right upper direction (a direction in which a pixel value variation ratio is large) in an edge pattern in the left upper and right lower inclination directions.

Likewise, when pixels Gb1 and Gb2 are interpolated to obtain a pixel Gb12 312, the G components at the same sampling interval as the resolution before the pixel adding process can be calculated on the line 302 in the right upper direction.

The above-described (b) process of using the plurality of signals, that is, the re-sampling process of calculating the pixel value of the object pixel position at which the final pixel value is set is performed using the plurality of pixel values such as the calculated interpolated pixel values.

The signals in which a higher-frequency component remains can be interpolated through the re-sampling process.

The re-sampling process can be performed, for example, by applying a predetermined re-sampling filter to the plurality of pixel value signals such as the calculated interpolated pixel values.

Figure 16:
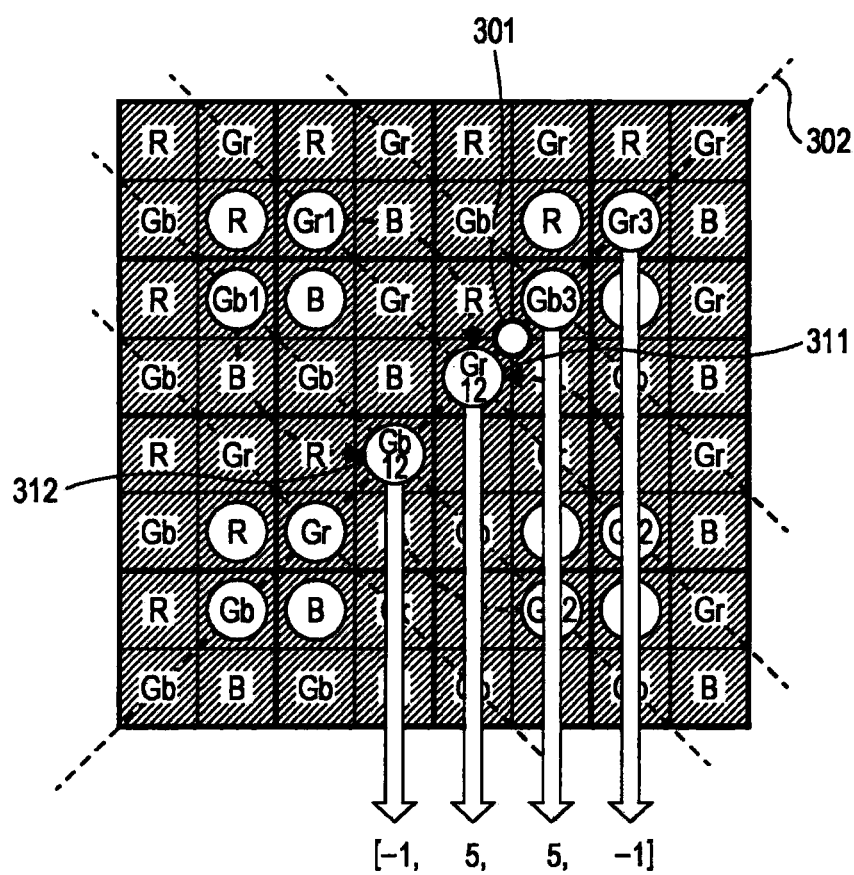
FIG. 16 is a diagram illustrating the process of calculating the smoothing G components ($G_L$) corresponding to the pattern having the edge of the left upper (L) direction.

For example, by convolving a linear filter with a high-frequency emphasis effect such as [−1, 5, 5, −1] for the four values of the components Gr12 311 and Gb12 312 interpolated in the inclination direction and the original components Gb3 and Gr3, as shown in FIG. 16, the signal subjected to the high-frequency emphasis at the interpolated pixel position 301 in the drawing is interpolated.

The interpolated signal is calculated as the smoothing G component ($G_L$) corresponding to the pattern having the edge in the left upper (L) direction. Specifically, the smoothing G component ($G_L$) is calculated by an equation below.

$$G_L = (-1(Gb12) + 5(Gr12) + 5(Gb3) - 1(Gr3))/8$$

In this equation, Gb12 is the pixel value of the pixel Gb12, Gr12 is the pixel value of the pixel Gr12, Gb3 is the pixel value of the pixel Gb3, and Gr3 is the pixel value of the pixel Gr3.

Further, the filter coefficient is just an example, and another filter coefficient may be used.

The number of interpolated components may be increased in the inclination direction to perform the re-sampling process with a larger linear filter. Since the signal with no deterioration in the resolution in the left upper and right lower directions can be interpolated at the large sampling interval through any method, it is possible to restore the signal with a resolution higher than that of normal re-sampling.

The smoothing G components ($G_R$ and $G_L$) of the left upper (L) direction can be calculated through the processes described above with reference to FIGS. 15 and 16. However, since the smoothing G components ($G_H$ and $G_V$) of the horizontal (H), vertical (V), and right upper (R) directions may not be calculated using the plurality of interpolated pixel values obtained by using the deviation in the pixel centroids, the re-sampling process is performed using the adjacent pixels.

The process of calculating the smoothing G component ($G_R$) of the right upper (R) direction in a case of an edge pattern of the right upper direction (R) will be described with reference to FIGS. 17A and 17B.

Figure 17A:
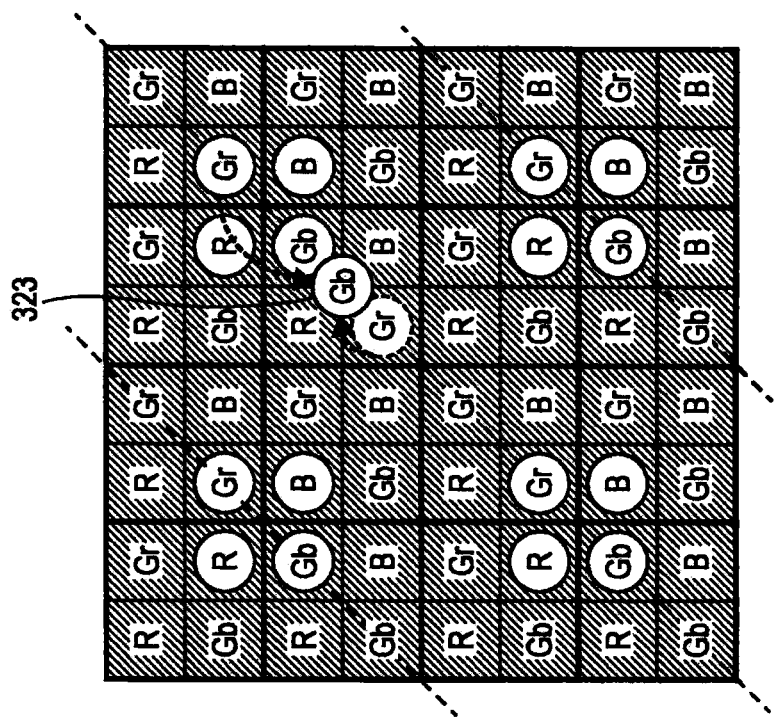
FIGS. 17A and 17B are diagrams illustrating a process of calculating smoothing G components ($G_R$) of the right upper (R) direction in a case of an edge pattern of the right upper (R) direction.

As shown in a first process of FIG. 17A, first, a pixel Gr 322 in an interpolated pixel position block 321 with four pixels which are a setting object of the interpolated pixels G is set by evenly adding and averaging the values of two Gr pixels (1:1 interpolation) using the pixels Gr present in blocks adjacent in the right upper and left lower directions and calculating the pixel value of the Gr pixel 322 shown in FIG. 17A. The centroid of the interpolated component is located inside the interpolated pixel position block 321.

Figure 17B:
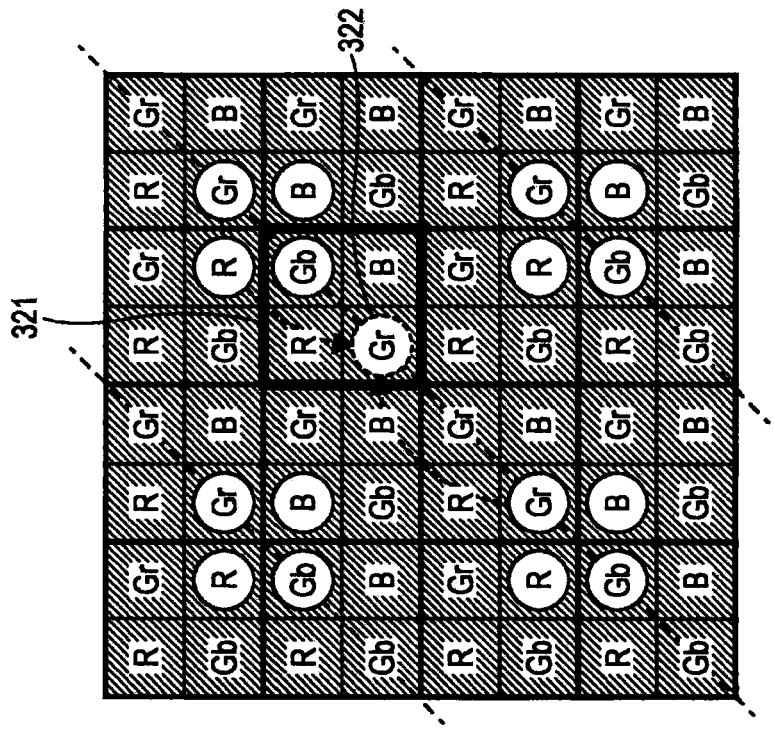

Next, as shown in a second process of FIG. 17B, a pixel value is calculated by adding and averaging the pixel value of the G component (Gb) of a centroid deviation correcting object located inside the interpolated pixel position block 321 and the pixel value component of the interpolated Gr pixel 322 in the first process at the ratio of 1:1, and then is set as an interpolated pixel 323 at the central position of the interpolated pixel position block 321.

Through the interpolating process, the centroid of the G component (Gb) of the centroid deviation correcting object can be moved to the center of the interpolated pixel position block 321.

Further, the interpolating process is equivalent in that a linear filter of [1, 2, 1] is convolved in order for two G components (Gr) adjacent to the centroid deviation correcting object G pixel (Gb) in the right upper and left lower directions.

The smoothing G components ($G_H$ and $G_V$) of the horizontal (H) and vertical (V) directions which correspond to the edge pattern of the horizontal and vertical directions are not subjected to the centroid deviation correction and are output without change, since the jaggies are not originally noticed.

(b) Interpolating Process Corresponding to Horizontal 1:3 and Vertical 1:1 Addition Next, an example of the interpolating process will be described with reference to each of FIG. 18 and the subsequent drawings, when the adding process at the horizontal 1:3 and vertical 1:1 ratios is performed.

The interpolating process in the case of the horizontal 1:3 and vertical 1:1 addition is basically equivalent to the interpolating process in the case of the horizontal 1:1 and vertical 1:1 addition described above. The pixel value at the position at which the deviation in the pixel centroids is corrected is calculated by performing the re-sampling process on the signal with a large sampling interval which can be extracted in a specific direction due to the deviation in the pixel centroids.

Figure 18:
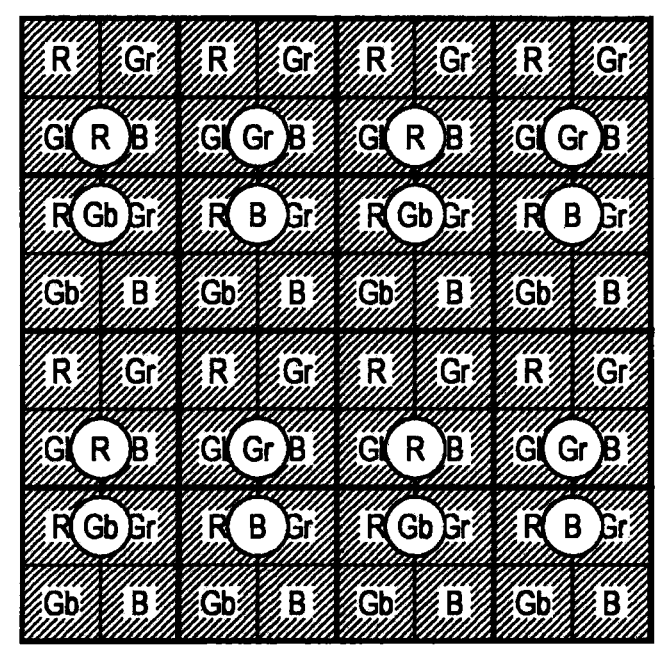

FIG. 18 is a diagram illustrating the centroid positions when the adding process is performed at the horizontal 1:3 and vertical 1:1 ratios. Since the centroid in the horizontal direction are located at the center of the pixels but the centroid positions in the vertical direction are deviated, a signal at the large sampling interval is interpolated using the deviation.

First, an interpolating process in the left upper (L) direction will be described with reference to FIG. 19. As in the horizontal 1:1 and vertical 1:1 addition, interpolation is performed in the left upper and right lower inclination directions between the pixels Gr and between the pixels Gb.

In this case, as in the above-described process, two processes are performed as follows:

(a) a process of calculating an interpolated pixel value in an edge direction; and (b) a re-sampling process of calculating the pixel value of an object pixel position, at which the final pixel value is set, using a plurality of pixel values such as the calculated interpolated pixel values.

Figure 19:
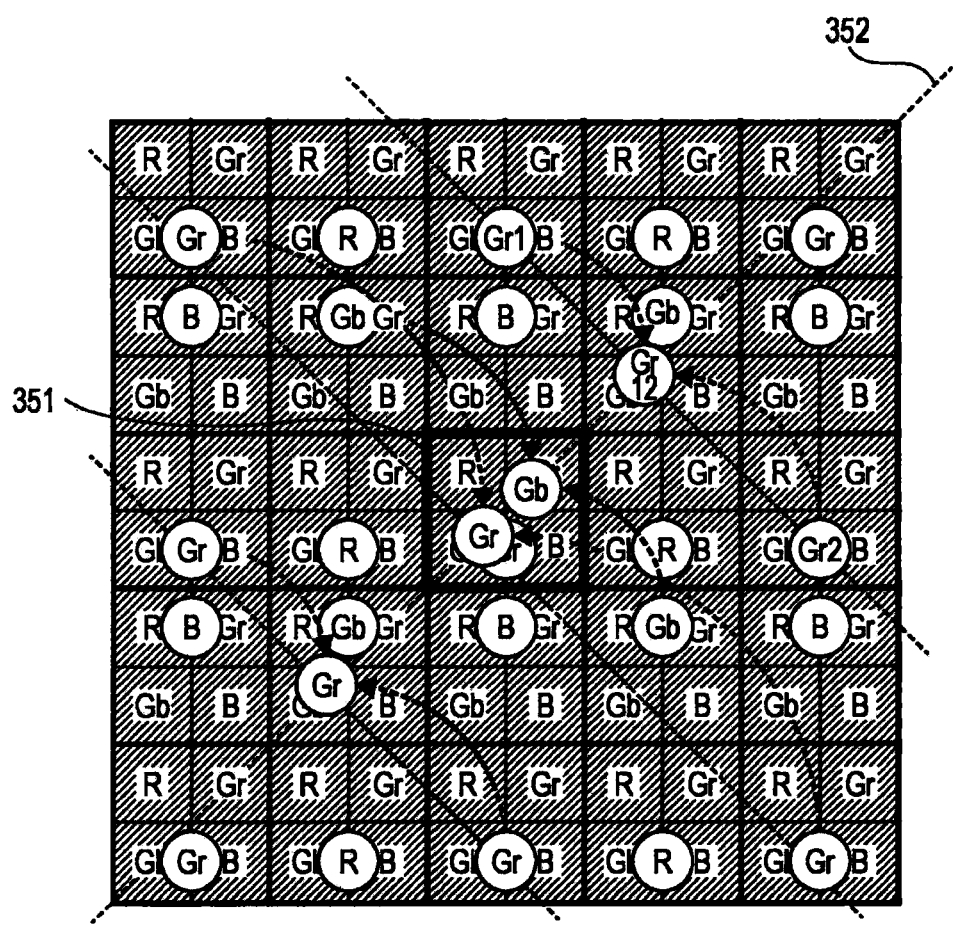
FIG. 19 is a diagram illustrating an example of the interpolating process when the adding process is performed at the horizontal 1:3 and vertical 1:1 ratios.

Weighting is performed in accordance with a distance between a straight line 352 and each pixel so that the centroid of each interpolated pixel is located on the straight line 352 inclined at 45 degrees in the right upper and left lower directions and perpendicular to the edge direction (the left upper (L) direction) passing through the center of a 4-pixel block 351 at the central position shown in FIG. 19.

Figure 20:
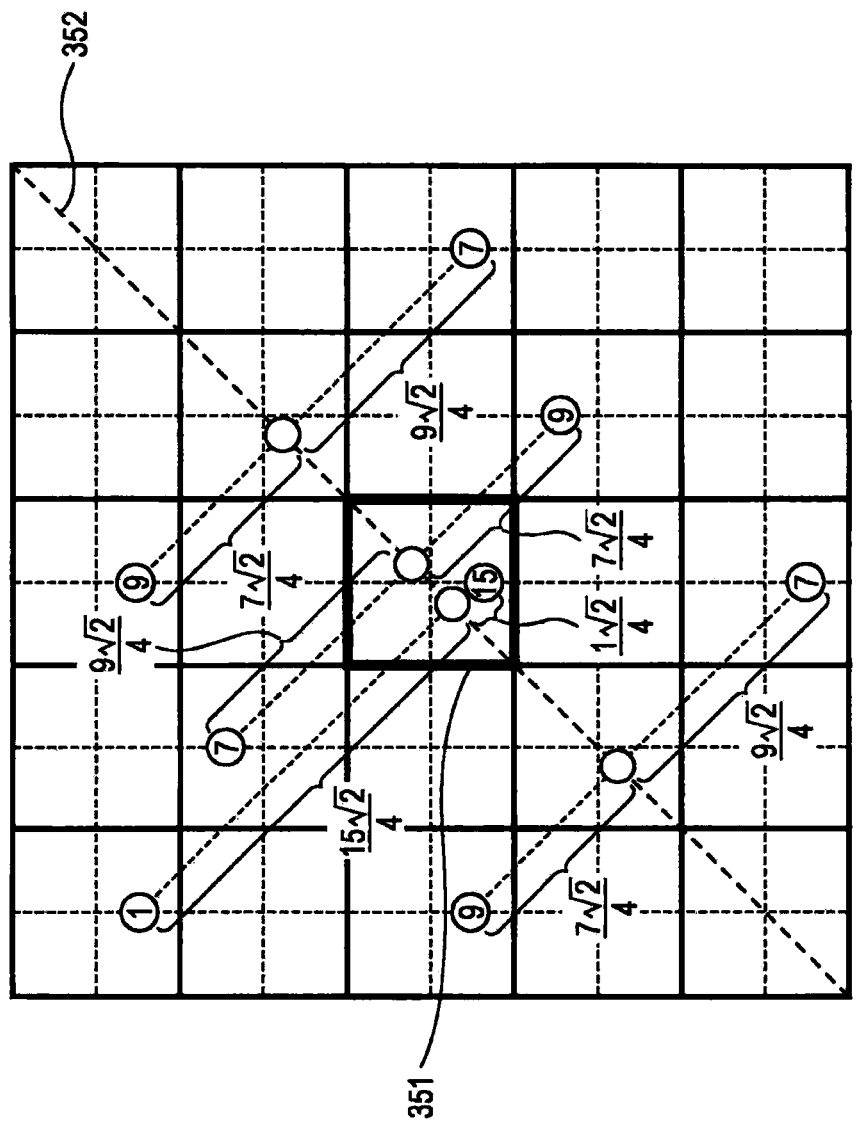
FIG. 20 is a diagram illustrating the distance between each G pixel and a straight line inclined at 45 degrees in the right upper and left lower directions and perpendicular to an edge direction (left upper (L) direction) passing through the center of a 4-pixel block at the center.

FIG. 20 shows the distance (of which a unit is the size of one pixel before the pixel adding process) between each G pixel and the straight line 352 inclined at 45 degrees in the right upper and left lower inclination direction and perpendicular to the edge direction (the left upper (L) direction) passing through the center of the 4-pixel block 351 at the central position. An internally dividing point at which the centroids overlap each other on a straight line is calculated in accordance with the distances.

For example, when the pixels Gr1 and Gr2 in FIG. 19 are interpolated, the distance between the pixel Gr1 and the straight line 352 is $7\sqrt{2}/4$ and the distance between the pixel Gr2 and the straight line 352 is $9\sqrt{2}/4$. Therefore, an internally dividing point Gr12 can be calculated by the weighted mean by applying an equation (Equation 3) below.

$$Gr1\_2 = \frac{\frac{9\sqrt{2}}{4} \cdot Gr1 + \frac{7\sqrt{2}}{4} \cdot Gr2}{\left(\frac{7\sqrt{2}}{4} + \frac{9\sqrt{2}}{4}\right)} = \frac{9Gr1 + 7Gr2}{16} \quad \text{(Equation 3)}$$

After the other internally dividing points are calculated, the re-sampling is performed on the signals. In this re-sampling process, any re-sampling filter with a high-frequency emphasis effect is used as in the horizontal 1:1 and vertical 1:1 addition.

The smoothing G components ($G_L$) are calculated through this process.

Next, an example of a process in the case of an edge pattern of the right upper (R) direction will be described. In this case, as in the left upper and right lower inclination directions, the interpolating process is performed in such a manner that the interpolated signals at a large sampling interval are once calculated by the weighted mean in accordance with the distances between the pixels and a line 353 perpendicular to the edge direction (right upper (R) direction), the interpolated signals are re-sampled, and then the object smoothing G components ($G_R$) are calculated.

Figure 21:
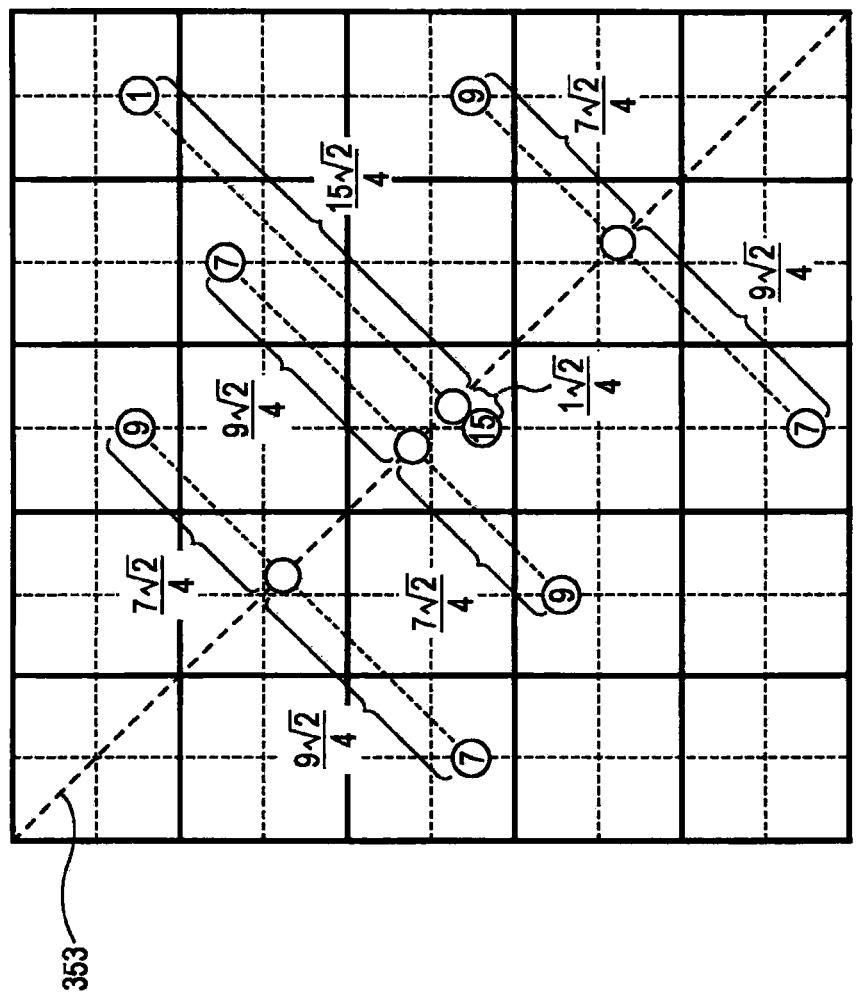
FIG. 21 is a diagram illustrating a distance distribution when interpolated signals are re-sampled in an edge pattern of the right upper (R) direction and an object smoothing G component ($G_R$) is calculated.

FIG. 21 shows the distribution of the distances in this case. The interpolating process is performed in accordance with the distances between the pixels and the line 353, as in the process described with reference to FIG. 20.

In the case of the horizontal (H) direction, the smoothing G components ($G_H$) of the horizontal (H) direction are calculated through a simple interpolation process.

Figure 22:
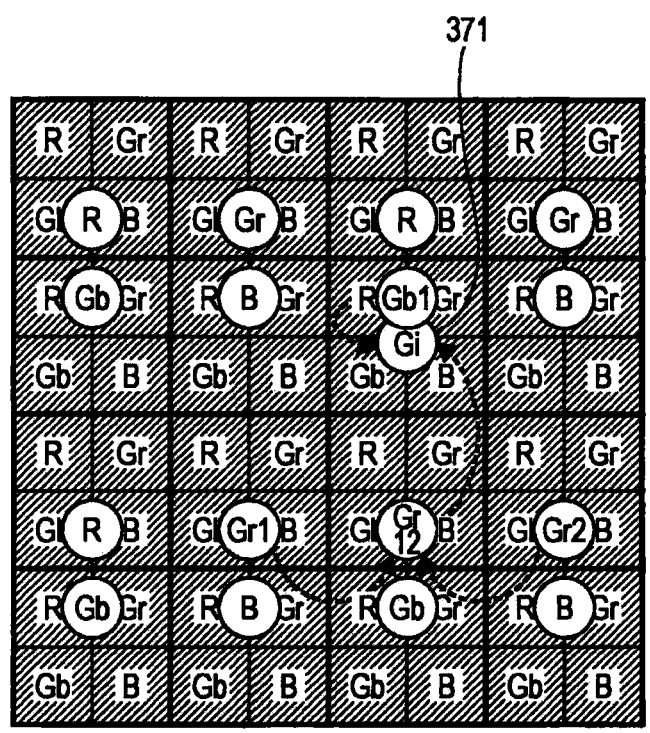
FIG. 22 is a diagram illustrating a process of calculating a smoothing G component ($G_H$) of the horizontal (H) direction.

As shown in FIG. 22, the interpolated component Gr12 of the horizontal direction is first generated using the G components (Gr1 and Gr2) adjacent in the longitudinal direction. Next, the weighted mean is calculated in accordance with the distance from an object pixel Gi 371 by using the pixel Gr12 and the pixel Gb1 of a block including the pixel Gi 371 of which the pixel value is to be calculated, and the pixel value of the pixel Gi is calculated. The calculated pixel Gi is set to the smoothing G component ($G_H$) of the horizontal (H) direction.

The weighted mean is calculated at the ratio of Gb1: Gr12=5:1.

When the object pixel is a Gr pixel, an upper and lower reversed arrangement is realized.

The components of the vertical (V) direction are not corrected. This is because the deviation in the pixel centroids does not occur in the lateral direction in the case of the horizontal 1:3 and vertical 1:1 ratios. Therefore, the components are not corrected in the pattern of which the edge extends in the longitudinal direction, and the value is output without change.

4-3. (Third Process) Process of Determining Weights ($W_H$, $W_V$, $W_R$, and $W_L$) to be Multiplied to Smoothing G Components ($G_H$, $G_V$, $G_R$, and $G_L$) of Horizontal (H), Vertical (V), Right Upper (R), and Left Upper (L) Directions Calculated through Second Process in Accordance with Edge Strengths ($D_H$, $D_V$, $D_R$, and $D_L$) of Four Directions Calculated through First Process Next, the third process, that is, the process of determining weights ($W_H$, $W_V$, $W_R$, and $W_L$) to be multiplied to the smoothing G components ($G_H$, $G_V$, $G_R$, and $G_L$) of the horizontal (H), vertical (V), right upper (R), and left upper (L) directions calculated through the second process in accordance with the edge strengths ($D_H$, $D_V$, $D_R$, and $D_L$) of the four directions calculated through the first process will be described.

The weights ($W_H$, $W_V$, $W_R$ and $W_L$) of the four directions are determined in accordance with the edge strengths ($D_H$, $D_V$, $D_R$, and $D_L$) of the four directions calculated through the first process.

In the first process, as described above, the following values are calculated in the G pixel (Gr and Gb) unit of the pixel number reduced image:

(1) $D_H$: the horizontal direction Laplacian value sum (weighted mean) of the Laplacian absolute values of the horizontal (H) direction;

(2) $D_V$: the vertical direction Laplacian value sum (weighted mean) of the Laplacian absolute values of the vertical (V) direction;

(3) $D_R$: the right upper direction Laplacian value sum (weighted mean) of the Laplacian absolute values of the right upper (R) direction; and (4) $D_L$: the left upper direction Laplacian value sum (weighted mean) of the Laplacian absolute values of the left upper (L) direction. Thus, the four-direction Laplacian value sums (weighted means) are calculated.

In the third process, a clipping process determined by a threshold value is first performed on the Laplacian value sum D to calculate the clipped sum D'.

The clipping process can be performed by a nonlinear function in an equation (Equation 4) below.

$$D' = \begin{cases} 0 & D < th_{lower} \\ \frac{1}{th_{upper} - th_{lower}} D - \frac{th_{lower}}{th_{upper} - th_{lower}} & th_{lower} \leq D < th_{upper} \\ 1 & D \geq th_{upper} \end{cases} \quad \text{(Equation 4)}$$

Figure 23:
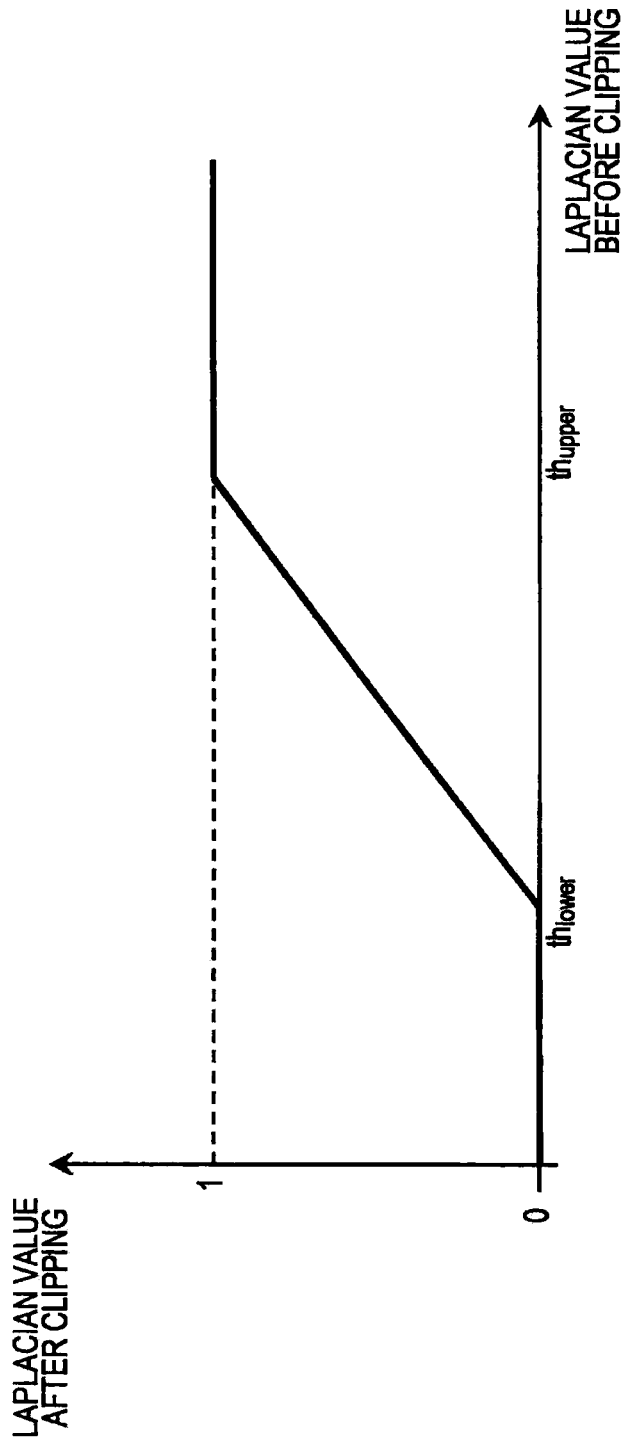
FIG. 23 is a diagram illustrating an example of a clipping function used to perform a clipping process determined by a threshold value on Laplacian value sums D.

FIG. 23 shows a clipping function.

As shown in FIG. 23, the lower limit threshold value $th_{lower}$ and the upper limit threshold value $th_{upper}$ are set and a weight distribution transitioning in a straight line is set between the lower limit threshold value $th_{lower}$ and the upper limit threshold value $th_{upper}$. The threshold value is set by an actual operation. The weights ($W_H$, $W_V$, $W_R$, and $W_L$) for the components of the four directions (the horizontal (H), vertical (V), right upper (R), and left upper (L) directions) are calculated using the obtained respective direction Laplacian value sums subjected to the clipping process by an equation (Equation 5) below.

$$W_H = \frac{1 + (D_V - D_H)}{2} \cdot \frac{1 + |D_V - D_H| - |D_L - D_R|}{2}$$

$$W_V = \frac{1 - (D_V - D_H)}{2} \cdot \frac{1 + |D_V - D_H| - |D_L - D_R|}{2}$$

$$W_R = \frac{1 + (D_L - D_R)}{2} \cdot \frac{1 - |D_V - D_H| - |D_L - D_R|}{2}$$

$$W_L = \frac{1 - (D_L - D_R)}{2} \cdot \frac{1 - |D_V - D_H| - |D_L - D_R|}{2}$$

$W_d$: weight of d direction $D_d$: d direction Laplacian value sum subjected to clipping H, V, R, L: horizontal direction, vertical direction, right upper inclination direction, and left upper inclination direction, respectively 4-4. (Fourth Process) Process of Calculating Output Pixel Values by Blending Process of Multiplying Smoothing G Components ($G_H$, $G_V$, $G_R$, and $G_L$) of Horizontal (H), Vertical (V), Right Upper (R), and Left Upper (L) Directions Calculated through Second Process by Weights ($W_H$, $W_V$, $W_R$, and $W_L$) Calculated through Third Process Finally, the fourth process, that is, the process of calculating the output pixel values by the blending process of multiplying the smoothing G components ($G_H$, $G_V$, $G_R$, and $G_L$) of the horizontal (H), vertical (V), right upper (R), and left upper (L) directions calculated through the second process by the weights ($W_H$, $W_V$, $W_R$, and $W_L$) calculated through the third process will be described.

In the fourth process, the blending process of multiplying the smoothing G components ($G_H$, $G_V$, $G_R$, and $G_L$) of the horizontal (H), vertical (V), right upper (R), and left upper (L) directions calculated through the second process by the weights ($W_H$, $W_V$, $W_R$, and $W_L$) calculated through the third process is performed.

The blending process is performed by, for example, an equation (Equation 6) below.

$$G' = W_H G_H + W_V G_V + W_R G_R + W_L G_L \quad \text{(Equation 6)}$$

$G_d$: G component interpolated in d direction

The pixel value (G') of the pixel number reduced and corrected image as the corrected image created by correcting the pixel number reduced image is determined through the above-described processes.

The pixel value G' calculated by the equation (Equation 6) above corresponds to a pixel value when the centroid position shown in part (c) of FIG. 5 is set to the central position of the 4×4 pixel block of the original captured image.

As a consequence, the centroid position is set to the central position of the 4×4 pixel block by correcting the G components in which the pixel centroids are deviated, thereby realizing the reduction in the jaggies.

5. Demosaic Process

Next, a process of the demosaic processing unit 153 shown in FIG. 5 will be described.

The demosaic processing unit 153 inputs the pixel number reduced and corrected image and performs a process of setting the pixel value of each of the RGB pixels to the position of each pixel of the pixel number reduced and corrected image.

The demosaic processing unit 153 is configured to perform a demosaic process of setting the pixel value of each of the RGB pixels by a process of using a correlation between the G and R pixels and a correlation between the G and B pixels.

In this processing example, only the pixel value of the G pixel is reset. For example, the specific reasons are as follows.

(1) In the demosaic process, the low-frequency components obtained from a pixel and the peripheral R/B pixels of the pixel are used when the low-frequency components of the R/B pixels are interpolated. The amount of deviation in the pixel centroids occurring the pixel adding and thinning processes is small to the error degree, compared to a low-frequency component calculation region. Accordingly, the deviation in the pixel centroids in the R/B pixels rarely affects the low-frequency components.

(2) In the demosaic process, the high-frequency components of the G components are used when the high-frequency components of the R/B pixels are interpolated. That is, the deviation in the pixel centroids in the R/B pixels rarely affects the interpolation of the high-frequency components.

Thanks to the above-mentioned reasons, the process is performed only on the G pixels and is not performed on the R/B pixels in this method. The sufficient jaggies reduction advantage is realized through the process.

6. Process Corresponding to Edge in Arbitrary Direction

As described above, the method of selecting the horizontal (H), vertical (V), right upper (R), or left upper (L) direction as the edge direction or the direction of the re-sampling process and performing the process has hitherto been described as an example. However, when the edge angle can be detected in an arbitrary direction, the re-sampling process may be performed using the pixel values of the pixels oriented in the edge direction.

Figure 24:
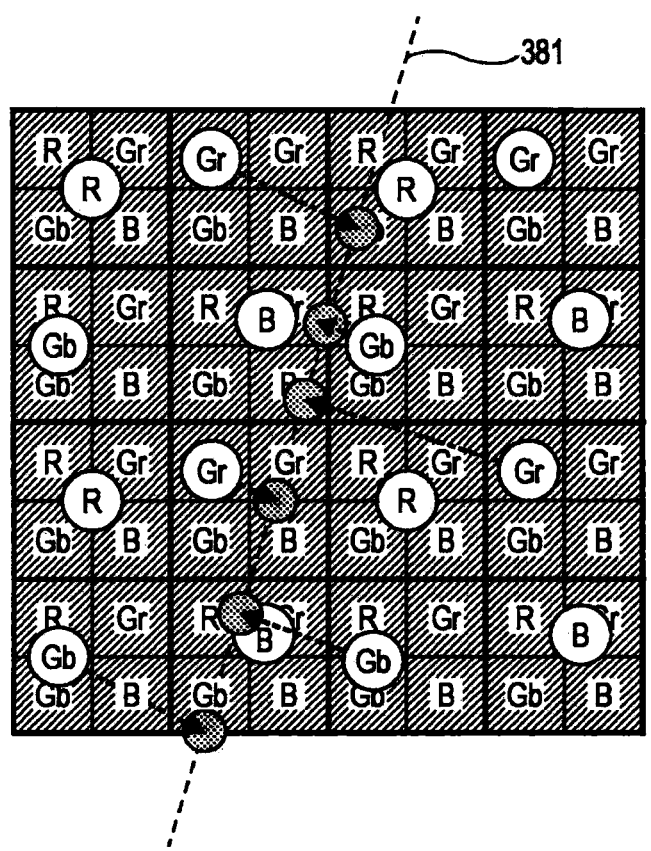
FIG. 24 is a diagram illustrating a process when an edge is detected in an arbitrary direction.

For example, as shown in FIG. 24, when an edge direction of an edge direction line 381 indicated by a dotted line is detected, the re-sampling process is performed on the edge direction line 381 based on the pixel values of the G pixels near the edge direction line 381 to calculate the re-sampled pixel values, and then the pixel values of the G pixels located at the necessary positions can be calculated using the re-sampled pixel values.

As a configuration for detecting the edge in an arbitrary direction, for example, an edge detecting filter of all directions can be used or a process such as the Hough transform can be applied.

In this way, the image correcting unit can calculate the edge direction passing through the center of the object G pixel in the raw image subjected to the pixel adding or thinning process of the imaging element based on the resolution before the pixel adding or thinning process, project the G pixels near the straight line perpendicular to the calculated edge direction, perform the re-sampling process on the projected G pixels in the direction perpendicular to the edge direction, and determine the pixel value of the object G pixel using the re-sampled signal which is the pixel value of the re-sampled pixel.

Further, in a configuration in which it is difficult to detect the edge in an arbitrary direction, the image correcting unit can express the edge direction by the linear sum of the edge components of predetermined specific directions, such as the horizontal (H), vertical (V), right upper (R), or left upper (L) direction, perform the re-sampling process on each edge component of the specific direction, perform the weighted mean on the re-sampled signals in the plurality of specific directions at the substantially identical ratio as that of the edge components of the expressed linear sum, and determine the pixel value of the object G pixel. When the appropriate edge direction is detected, only the process based on the detected edge direction is performed to determine the pixel value of the object pixel without performing the blending process such as the weighted mean in accordance with the edge component of the specific direction.

7. Overview of Configuration and Process of Image Correcting Unit

Next, the processes of the image correcting unit 152 will be described in sequence with a processing unit with reference to FIG. 25 and the subsequent drawings.

As described above, the image correcting unit 152 performs the following four processes:

(first process) the process of calculating the edge strengths ($D_H$, $D_V$, $D_R$, and $D_L$) of a total of four directions, that is, the horizontal (H), vertical (V), right upper (R), and left upper (L) directions using the G components of the pixel number reduced image (raw image);

(second process) the process of calculating smoothing G components ($G_H$, $G_V$, $G_R$, and $G_L$) of a total of four directions, that is, the horizontal (H), vertical (V), right upper (R), and left upper (L) directions;

(third process) the process of determining weights ($W_H$, $W_V$, $W_R$, and $W_L$) to be multiplied to the smoothing G components ($G_H$, $G_V$, $G_R$, and $G_L$) of the horizontal (H), vertical (V), right upper (R), and left upper (L) directions calculated through the second process in accordance with the edge strengths ($D_H$, $D_V$, $D_R$, and $D_L$) of the four directions calculated through the first process; and (fourth process) the process of calculating the output pixel values by a blending process of multiplying the smoothing G components ($G_H$, $G_V$, $G_R$, and $G_L$) of the horizontal (H), vertical (V), right upper (R), and left upper (L) directions calculated through the second process by the weights ($W_H$, $W_V$, $W_R$, and $W_L$) calculated through the third process.

The image correcting unit 152 performs the four processes, that is, the first to fourth processes.

Figure 25:
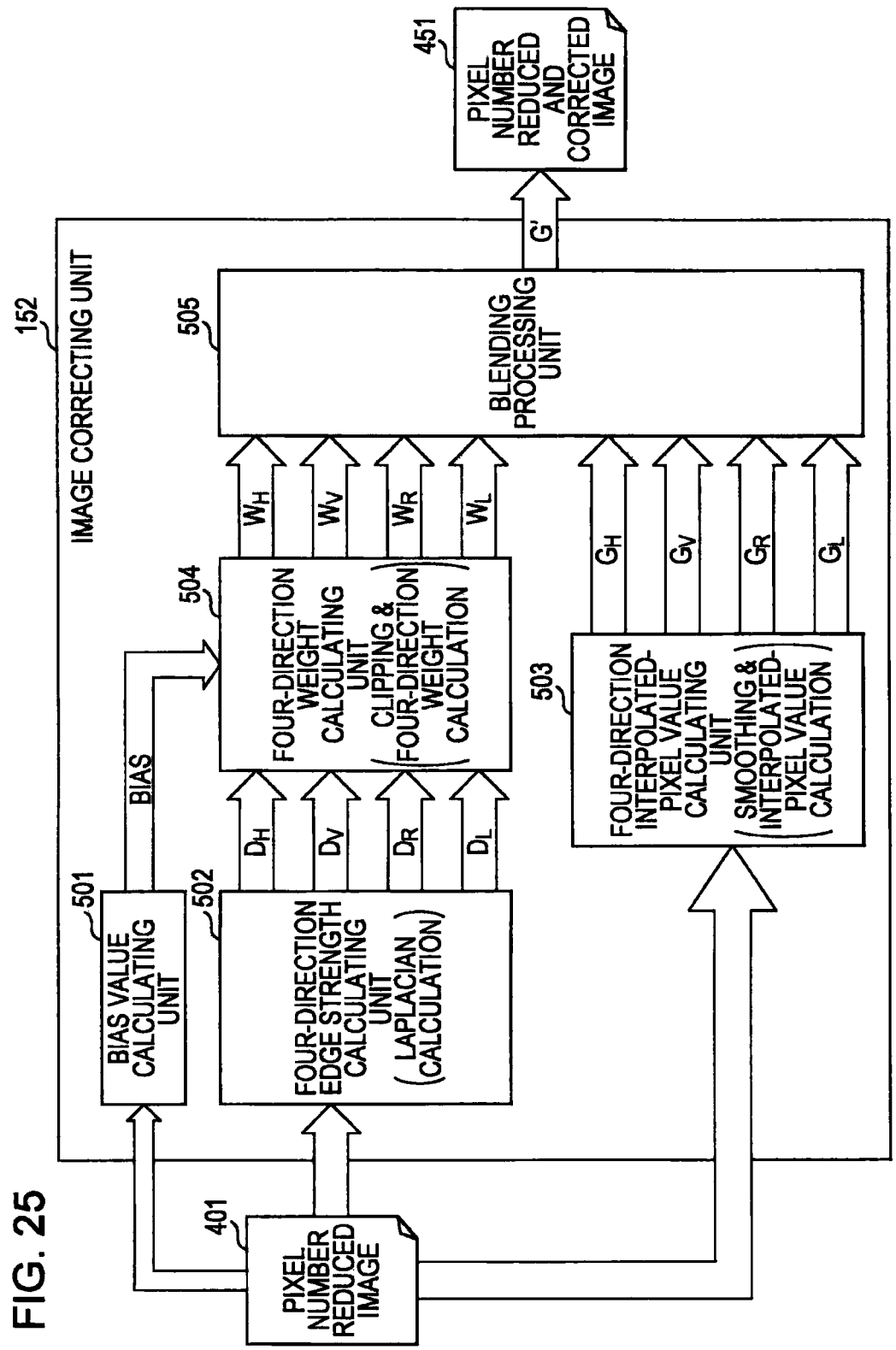
FIG. 25 is a diagram illustrating the summary of the configuration and the process of an image correcting unit.

FIG. 25 is a diagram illustrating the detailed configuration of the image correcting unit 152 including the respective processing units performing the above-mentioned processes.

As shown in FIG. 25, the image correcting unit 152 includes a bias value calculating unit 501, a four-direction edge strength calculating unit 502, a four-direction interpolated-pixel value calculating unit 503, a four-direction weight calculating unit 504, and a blending processing unit 505.

The four-direction edge strength calculating unit 502 performs the above-described process (the first process), that is, the process of calculating the edge strengths ($D_H$, $D_V$, $D_R$, and $D_L$) of a total of four directions, that is, the horizontal (H), vertical (V), right upper (R), and left upper (L) directions using the G components of the pixel number reduced image (raw image).

The four-direction interpolated-pixel value calculating unit 503 performs the above-described process (the second process), that is, the process of calculating smoothing G components ($G_H$, $G_V$, $G_R$, and $G_L$) of a total of four directions, that is, the horizontal (H), vertical (V), right upper (R), and left upper (L) directions.

The four-direction weight calculating unit 504 performs the above-described process (the third process), that is, the process of determining weights ($W_H$, $W_V$, $W_R$, and $W_L$) to be multiplied to the smoothing G components ($G_H$, $G_V$, $G_R$, and $G_L$) of the horizontal (H), vertical (V), right upper (R), and left upper (L) directions calculated through the second process in accordance with the edge strengths ($D_H$, $D_V$, $D_R$, and $D_L$) of the four directions calculated through the first process.

The blending processing unit 505 performs the above-described process (the fourth process), that is, the process of calculating the output pixel values by a blending process of multiplying the smoothing G components ($G_H$, $G_V$, $G_R$, and $G_L$) of the horizontal (H), vertical (V), right upper (R), and left upper (L) directions calculated through the second process by the weights ($W_H$, $W_V$, $W_R$, and $W_L$) calculated through the third process.

As shown in FIG. 25, the image correcting unit 152 inputs a pixel number reduced image 401, creates a pixel number reduced and corrected image 451 through the image correcting process, and outputs the number reduced and corrected image 451.

The pixel number reduced image 401 shown in FIG. 25 corresponds to the pixel number reduced image shown in part (b) of FIG. 5 and created by the pixel number reducing unit 151 shown in FIG. 5.

The number reduced and corrected image 451 shown in FIG. 25 corresponds to the pixel number reduced and corrected image shown in part (c) of FIG. 5.

Further, the image correcting unit 152 inputs the pixel blocks of the pixel number reduced image 401 in a unit of a predetermined N×N pixel block and processes the pixel blocks in sequence.

Figure 26A:
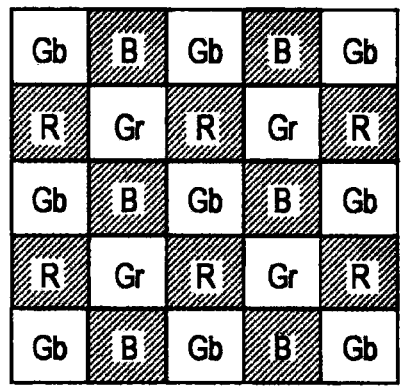
FIGS. 26A to 26C are diagrams illustrating examples of the pixel blocks to be processed by the image correcting unit.
Figure 26B:
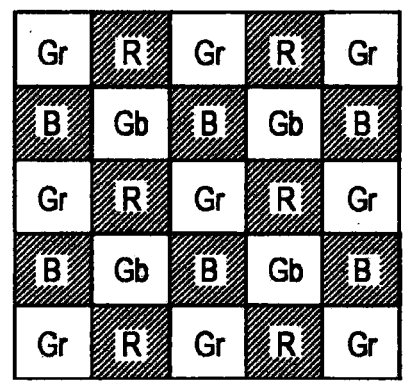

Here, as shown in FIGS. 26A and 26B, an example will be described in which pixel blocks with 5×5 pixels, in which the G pixel (Gb or Gr) serves as the center pixel, are input and the process is performed in the unit of the pixel block, and the pixel values of the center G pixels (Gb or Gr) serving as the center are calculated.

Figure 26C:
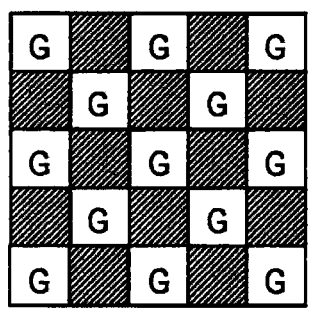

In the following description, the pixels Gr and Gb are collectively referred to as G pixels, as shown in FIG. 26C.

Hereinafter, the process of each of the following constituent units will be described:

the bias value calculating unit 501;
the four-direction edge strength calculating unit 502;
the four-direction interpolated-pixel value calculating unit 503;
the four-direction weight calculating unit 504; and
the blending processing unit 505.

7-1. Process of Bias Value Calculating Unit

Figure 27:
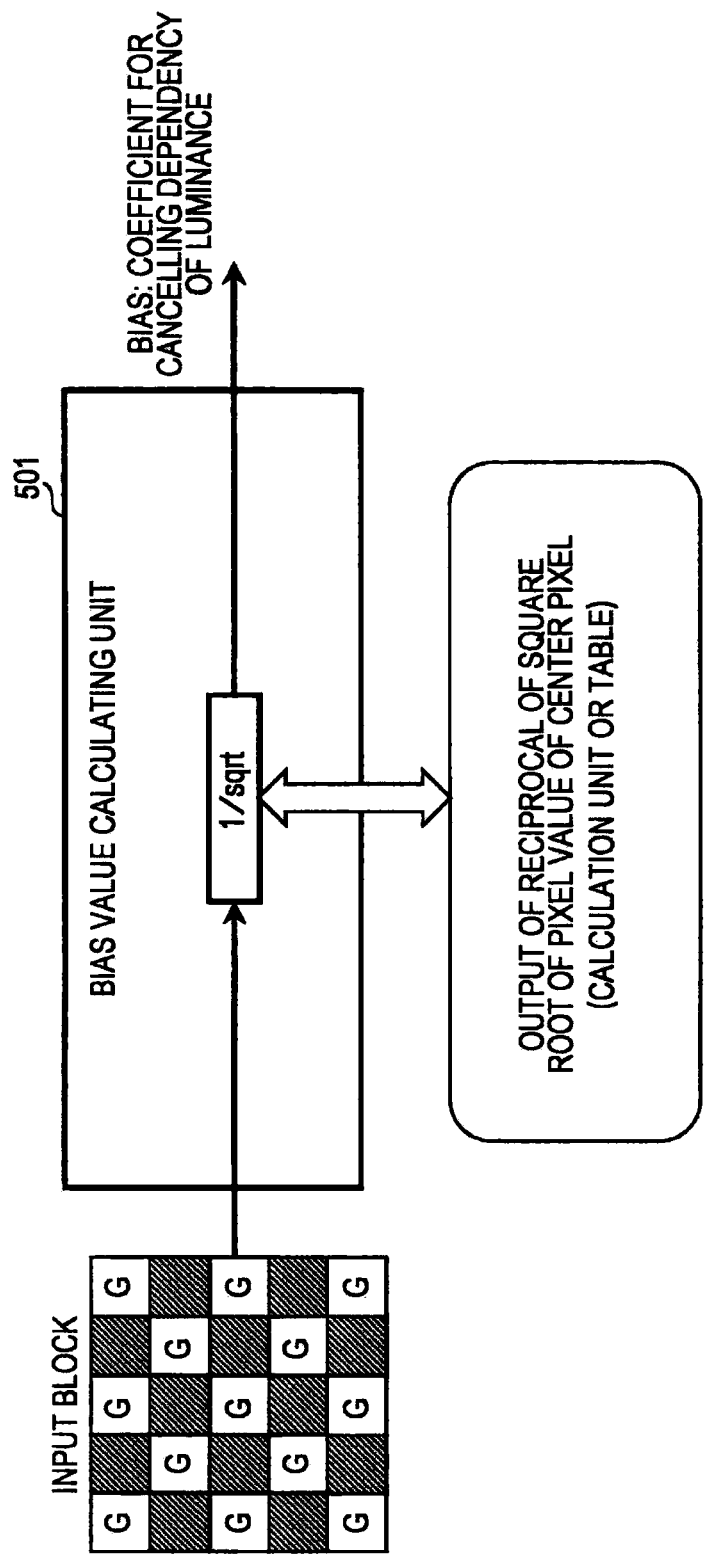
FIG. 27 is a diagram illustrating the process of a bias value calculating unit.

First, the process of the bias value calculating unit 501 will be described with reference to FIG. 27.

The bias value calculating unit 501 performs a process of calculating, as a bias value, a coefficient for cancelling the luminance dependency of the Laplacian value sums which are the edge strengths ($D_H$, $D_V$, $D_R$, and $D_L$) of a total of four directions, that is, the horizontal (H), vertical (V), right upper (R), and left upper (L) directions which are calculated by the four-direction edge strength calculating unit 502.

For example, the coefficient (bias value) is calculated as the reciprocal of the square root of the pixel value of the center pixel (G) of the input pixel block (5×5 pixel block). The bias value calculating unit 501 may be configured as a calculating unit that calculates the reciprocal of the square root of the pixel value of the center pixel (G). In the actual calculation, however, it is necessary to perform division and square root calculation. Therefore, a table of the calculation results may be made in advance and kept and the coefficient (bias value) may be output using the table.

It is possible to reduce the calculation amount by using the table.

The coefficient (bias value) calculated by the bias value calculating unit 501 is input to the four-direction weight calculating unit 504 that calculates the weight of each direction from the Laplacian value sum and is used to cancel the luminance dependency of the Laplacian value sum.

7-2. Process of Four-direction Edge Strength Calculating Unit

Next, the process of the four-direction edge strength calculating unit 502 will be described with reference to FIG. 28 and the subsequent drawings. The four-direction edge strength calculating unit 502 performs the above-described process (the first process), that is, the process of calculating the edge strengths ($D_H$, $D_V$, $D_R$, and $D_L$) of a total of four directions, that is, the horizontal (H), vertical (V), right upper (R), and left upper (L) directions using the G components of the pixel number reduced image (raw image).

Figure 28:
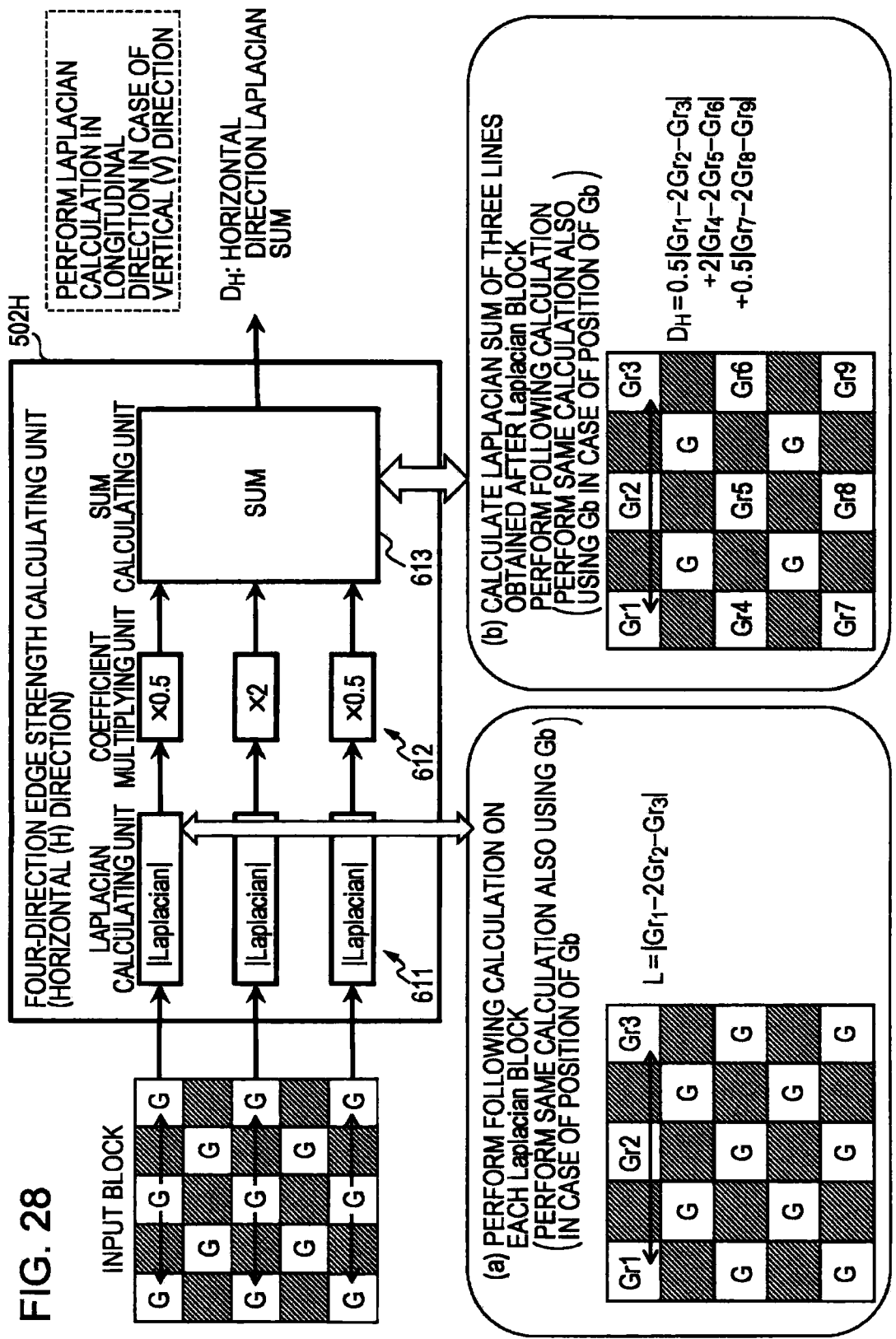
FIG. 28 is a diagram illustrating the process of a four-direction edge strength calculating unit.

FIG. 28 is a diagram illustrating the detailed configuration of the four-direction edge strength calculating unit 502H of the horizontal (H) direction.

As shown in FIG. 28, a four-direction edge strength calculating unit 502H of the horizontal (H) direction includes a Laplacian calculating unit 611, a coefficient multiplying unit 612, and a sum calculating unit 613.

The Laplacian calculating unit 611 calculates a Laplacian absolute value using the pixel values of three G pixels included in each of the first, third, and fifth horizontal lines of the input pixel block (5×5 pixel block).

For example, in the process of calculating the Laplacian absolute value of the first horizontal line, as shown in part (a) of FIG. 28, the Laplacian absolute value (L) is calculated by an equation below.

$$L=|Gr_1-2Gr_2-Gr_3|$$

The Laplacian absolute value (L) corresponding to each of the other lines is calculated using the pixel values of the three G pixels.

The coefficient multiplying unit 612 multiplies the calculated value (the Laplacian absolute value (L)), which corresponds to each line calculated by the Laplacian calculating unit 611, by the coefficient (bias value) calculated by the bias value calculating unit 501. This process is a process of cancelling the luminance dependency of the Laplacian value sum.

In the drawing, 0.5, 2, and 0.5 are used as the examples of the coefficients, but these values are just examples of the coefficient. Other coefficients may be used.

The coefficient (bias value) multiplying process corresponds to the process of calculating the weighted mean of the Laplacian absolute values based on the weighted value setting described above with reference to FIG. 10.

The sum calculating unit 613 inputs the output of the coefficient multiplying unit 612 and calculates the Laplacian value sum corresponding to the edge strength ($D_H$) of the horizontal (H) direction.

As shown in part (b) of FIG. 28, the sum calculating unit 613 calculates the edge strength ($D_H$) (=the Laplacian value sum) of the horizontal (H) direction by an equation below.

$$D_H = 0.5|Gr_1-2Gr_2-Gr_3|+2|Gr_4-2Gr_5-Gr_6|+0.5|Gr_7-2Gr_8-Gr_9|$$

Here, the example of the process performed on the 5×5 pixel block in which the Gr pixel is the center pixel has been described. However, even when the Gb pixel is the center pixel, the same process of calculating the edge strength (=the Laplacian value sum) is performed based on the pixel value of the Gb pixel.

When the edge strength ($D_V$) (=the Laplacian value sum) of the vertical (V) direction is calculated, the process is performed using the pixel values of the G (Gr or Gb) pixels in the longitudinal lines of the left end, the central, and the right end of a 5×5 pixel block.

Next, an edge strength calculating unit 502R of the right upper (R) direction will be described in detail with reference to FIG. 29.

Figure 29:
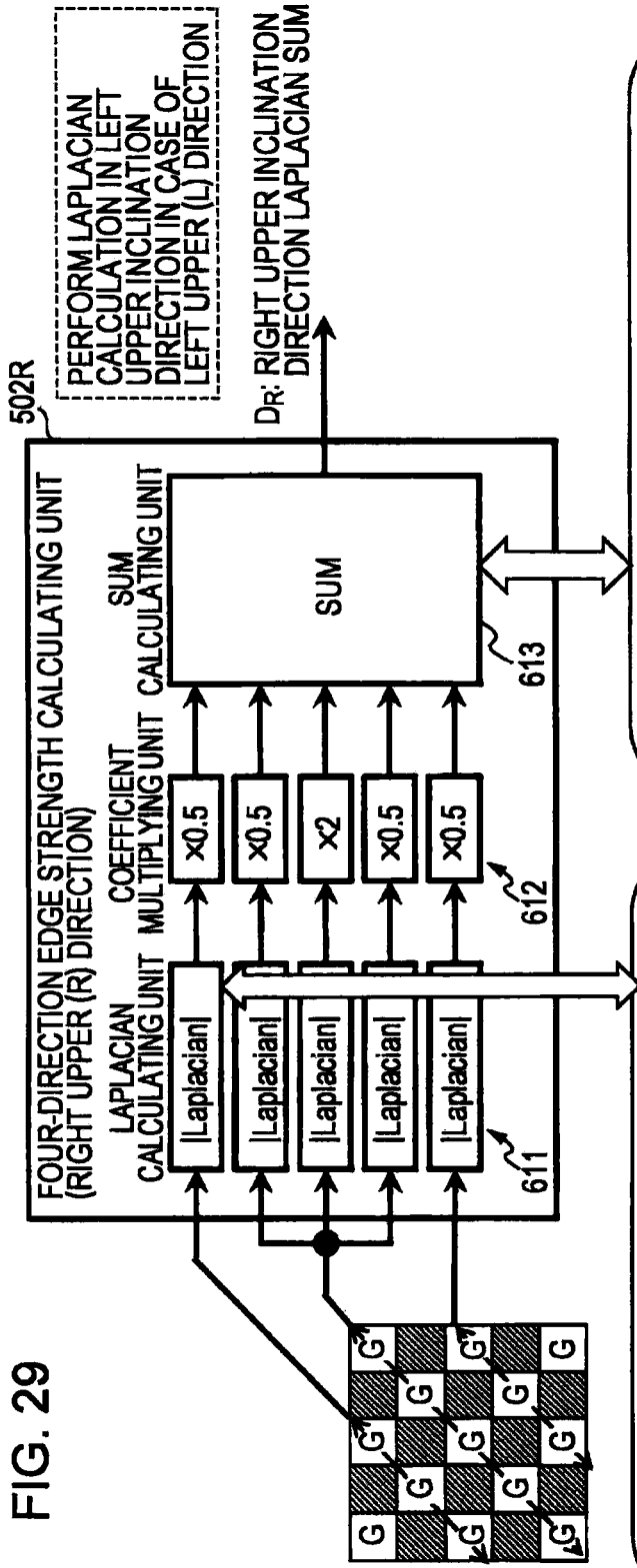
FIG. 29 is a diagram illustrating the process of a four-direction edge strength calculating unit.

As shown in FIG. 29, the edge strength calculating unit 502R of the right upper (R) direction includes a Laplacian calculating unit 611, a coefficient multiplying unit 612, and a sum calculating unit 613.

The Laplacian calculating unit 611 calculates a Laplacian absolute value using the pixel values of three G pixels included in three right upper inclination lines, in which three G pixels can be acquired, in the input pixel block (5×5 pixel block).

For example, as shown in part (a) of FIG. 29, the Laplacian absolute value (L) on the left upper side is calculated by an equation below.

$$L=|Gr_1-2Gr_2-Gr_3|$$

The Laplacian absolute value (L) corresponding to each of the other lines is calculated using the pixel values of the three G pixels.

The right upper line passing through the center pixels includes five G pixels. Therefore, three Laplacian absolute values (L) corresponding to three pixel groups constituted by three continuous G pixels are calculated from the five G pixels of the right upper line passing through the center pixels.

That is, the Laplacian calculating unit 611 calculates a total of five Laplacian absolute values, that is, one Laplacian absolute value (L) from the right upper inclination line on the left upper side, three Laplacian absolute values (L) from the right upper inclination line including the center pixels, and one Laplacian absolute value (L) from the right upper inclination line on the right lower side.

The coefficient multiplying unit 612 multiplies the values (the Laplacian absolute values (L)) calculated by the Laplacian calculating unit 611 by the coefficients (bias values) calculated by the bias value calculating unit 501. This process is a process of cancelling the luminance dependency of the Laplacian value sum.

In the drawing, 0.5, 0.5, 2, 0.5, and 0.5 are used as the examples of the coefficients, but these values are just examples of the coefficient. Other coefficients may be used.

The sum calculating unit 613 inputs the output of the coefficient multiplying unit 612 and calculates the Laplacian value sum corresponding to the edge strength ($D_R$) of the right upper (R) direction.

As shown in part (b) of FIG. 29, the sum calculating unit 613 calculates the edge strength ($D_R$) (=the Laplacian value sum) of the right upper (R) direction by an equation below.

$$D_R = 0.5|Gr_1 - 2Gr_2 - Gr_3| + 0.5|Gr_4 - 2Gr_5 - Gr_6| +$$
$$2|Gr_5 - 2Gr_6 - Gr_7| + 0.5|Gr_6 - 2Gr_7 - Gr_8| + 0.5|Gr_9 - 2Gr_{10} - Gr_{11}|$$

Here, the example of the process performed on the 5×5 pixel block in which the Gr pixel is the center pixel has been described. However, even when the Gb pixel is the center pixel, the same process of calculating the edge strength (=the Laplacian value sum) is performed based on the pixel value of the Gb pixel.

When the edge strength ($D_L$) (=the Laplacian value sum) of the left upper (L) direction is calculated, the process is performed using the pixel values of the G (Gr or Gb) pixels in the three left upper inclination lines acquired from the 5×5 pixel block.

7-3. Process of Four-Direction Interpolated-Pixel Value Calculating Unit

Next, the process of the four-direction interpolated-pixel value calculating unit 503 will be described.

As described above, the four-direction interpolated-pixel value calculating unit 503 performs the following process (the second process), that is, the process of calculating the smoothing G components ($G_H$, $G_V$, $G_R$, and $G_L$) of a total of four directions, that is, the horizontal (H), vertical (V), right upper (R), and left upper (L) directions.

Figure 30:
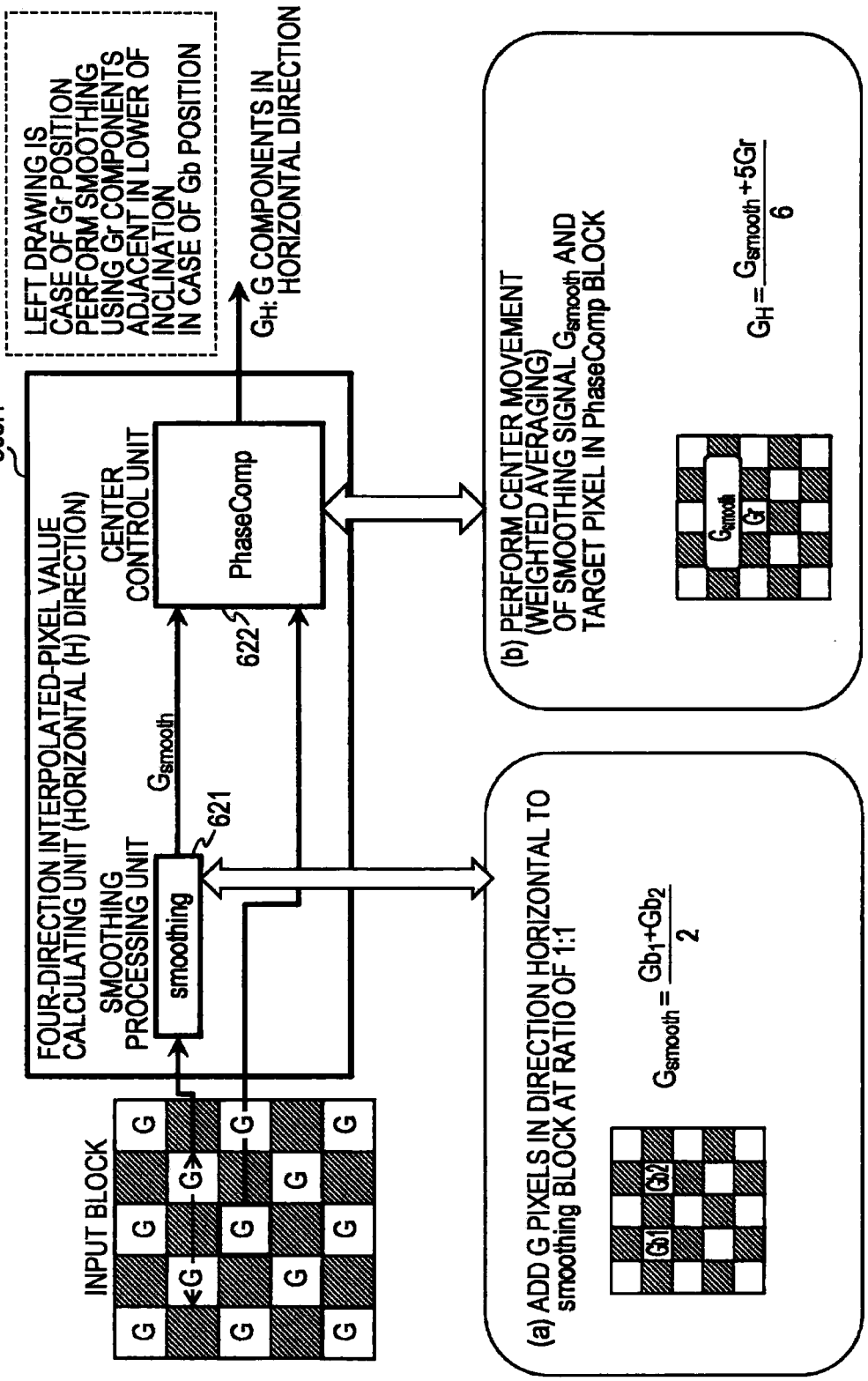
FIG. 30 is a diagram illustrating the process of a four-direction interpolated-pixel value calculating unit.

FIG. 30 is a diagram illustrating the detailed configuration of the interpolated-pixel value calculating unit 503H of the horizontal (H) direction.

As shown in FIG. 30, the interpolated-pixel value calculating unit 503H of the horizontal (H) direction includes a smoothing processing unit 621 and a centroid control unit 622.

The smoothing processing unit 621 calculates an average value $G_{smooth}$ of the pixel values of two G pixels of a horizontal line above or below the center pixel of an input pixel block (5×5 pixel block) which is an object pixel to be processed.

For example, as shown in part (a) of FIG. 30, the average value $G_{smooth}$ of the pixel values of the two G pixels is calculated by an equation below.

$$G_{smooth} = (Gb1 + Gb2)/2$$

The centroid control unit 622 calculates a smoothing G component ($G_H$) of the horizontal (H) direction by calculating the weighted mean of the value ($G_{smooth}$) calculated by the smoothing processing unit 621 and the pixel value of the center pixel which is the pixel to be processed in the input pixel block (5×5 pixel block). For example, as shown in part (b) of FIG. 30, the smoothing G component ($G_H$) of the horizontal (H) direction is calculated by an equation below.

$$G_H = (G_{smooth} + 5Gr)/6$$

In the process of calculating the interpolated-pixel value in the four-direction interpolated-pixel value calculating unit 503, for example, as described above with reference to FIGS. 13A to 21, the process of calculating the interpolated-pixel value is performed based on the pixels which are included in the pixel number reduced image shown in part (b) of FIG. 5 and in which the deviation in the pixel centroids occurs.

Accordingly, for example, as described above by comparing FIGS. 13A and 13B to each other, the interpolated-pixel values can be calculated using the pixels Gb and Gr set in the denser Gr lines and Gb lines, and thus the pixel values of the interpolated pixels can be calculated using the high-resolution signals of the dense Gr lines and Gb lines. As a consequence, the pixel values can be set so that the deterioration in the resolution is suppressed.

In FIG. 30, the case where the center pixel is the Gr pixel has been described. However, even when the center pixel is the Gb pixel, the same equation in which the Gr pixels are substituted by the Gb pixels can be applied.

Figure 31:
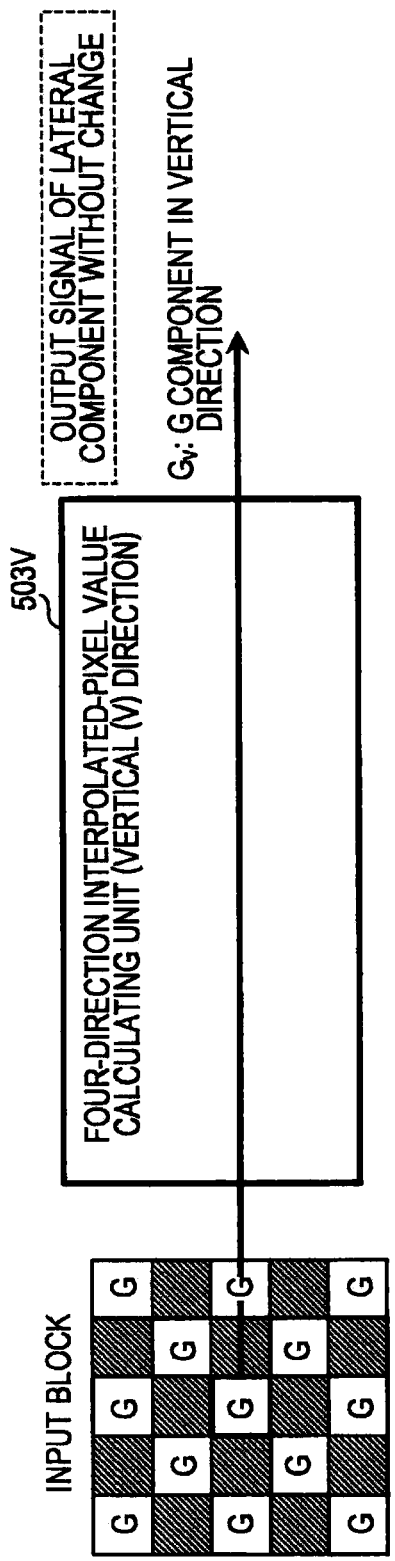
FIG. 31 is a diagram illustrating the process of a four-direction interpolated-pixel value calculating unit.

FIG. 31 is a diagram illustrating the detailed configuration of an interpolated-pixel value calculating unit 503V of the vertical (V) direction.

As the smoothing G component ($G_V$) of the vertical (V) direction, the pixel value of the G pixel which is a pixel to be processed and is present at the center of the 5×5 pixel block is used without change.

Next, the detailed configuration of an interpolated-pixel value calculating unit 503R of the right upper (R) direction will be described with reference to FIG. 32.

Figure 32:
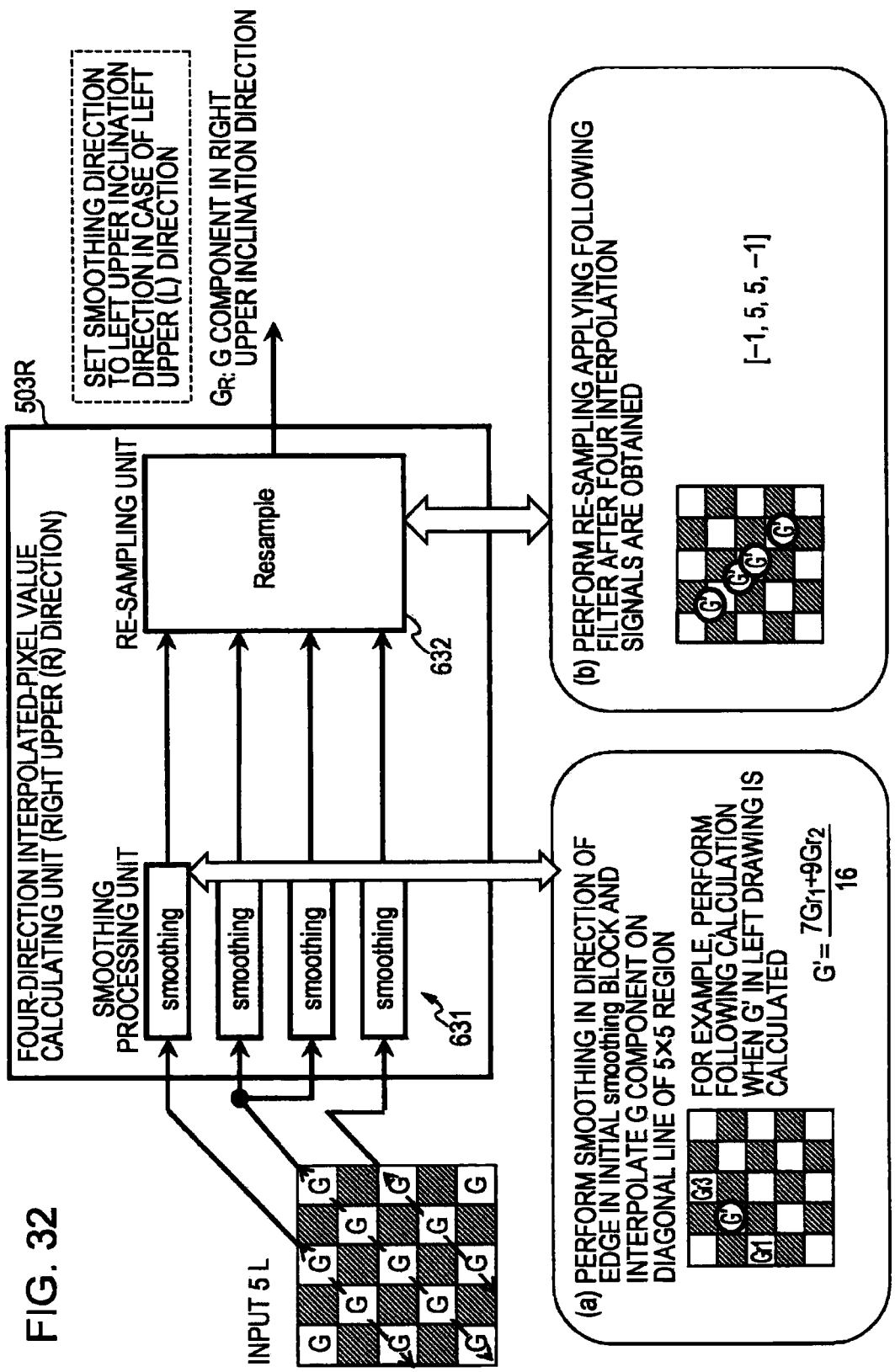
FIG. 32 is a diagram illustrating the process of a four-direction interpolated-pixel value calculating unit.

As shown in FIG. 32, the interpolated-pixel value calculating unit 503R of the right upper (R) direction includes a smoothing processing unit 631 a re-sampling unit 632.

The smoothing processing unit 631 obtains a total of four smoothing signals using two pixels of the same pixels (Gr or Gb) as the center pixel present in three right upper (R) direction lines, that is, a right upper (R) direction line on the left upper side, a right upper (R) direction line passing through the center pixel, and a right upper (R) direction line on the right lower side with respect to the center pixel which is the pixel to be processed in the input pixel block (5×5 pixel block).

For example, part (a) of FIG. 32 shows a calculation example of a smoothing signal value (G') using three continuous G pixels of the right upper (R) direction line on the left upper side with respect to the center pixel of the input pixel block (5×5 pixel block).

The smoothing signal value (G') is calculated by an equation below.

$$G' = (7Gr_1 + 9Gr_2)/16$$

As in part (a) of FIG. 32, the smoothing processing unit 631 obtains a total of four smoothing signals using two pixels of the same pixels (Gr or Gb) as the center pixel present in three right upper (R) direction lines, that is, a right upper (R) direction line on the left upper side, a right upper (R) direction line passing through the center pixel, and a right upper (R) direction line on the right lower side with respect to the center pixel which is the pixel to be processed in the input pixel block (5×5 pixel block).

The re-sampling unit 632 calculates a smoothing G component ($G_R$) of the right upper (R) direction corresponding to the center pixel which is a pixel to be processed in the input pixel block (5×5 pixel block) using the four smoothing signals. For example, as shown in part (b) of FIG. 32, the smoothing G component ($G_R$) of the right upper (R) direction corresponding to the center pixel is calculated applying a filter [−1, 5, 5, −1] to the four smoothing signals G'.

In FIG. 32, the process of calculating the smoothing G components ($G_R$) of the right upper (R) direction by the interpolated-pixel value calculating unit 503R of the right upper (R) direction has been described. However, in a process of calculating the smoothing G component ($G_L$) of the left upper (L) direction by an interpolated-pixel value calculating unit 503L of the left upper (L) direction, a line in the left upper (L) direction is used.

7-4. Process of Four-Direction Weight Calculating Unit

Next, the process of the four-direction weight calculating unit 504 will be described.

As described above, the four-direction weight calculating unit 504 performs the above-described process (the third process), that is, the process of determining weights ($W_H$, $W_V$, $W_R$, and $W_L$) to be multiplied to the smoothing G components ($G_H$, $G_V$, $G_R$, and $G_L$) of the horizontal (H), vertical (V), right upper (R), and left upper (L) directions calculated through the second process in accordance with the edge strengths ($D_H$, $D_V$, $D_R$, and $D_L$) of the four directions calculated through the first process.

Figure 33:
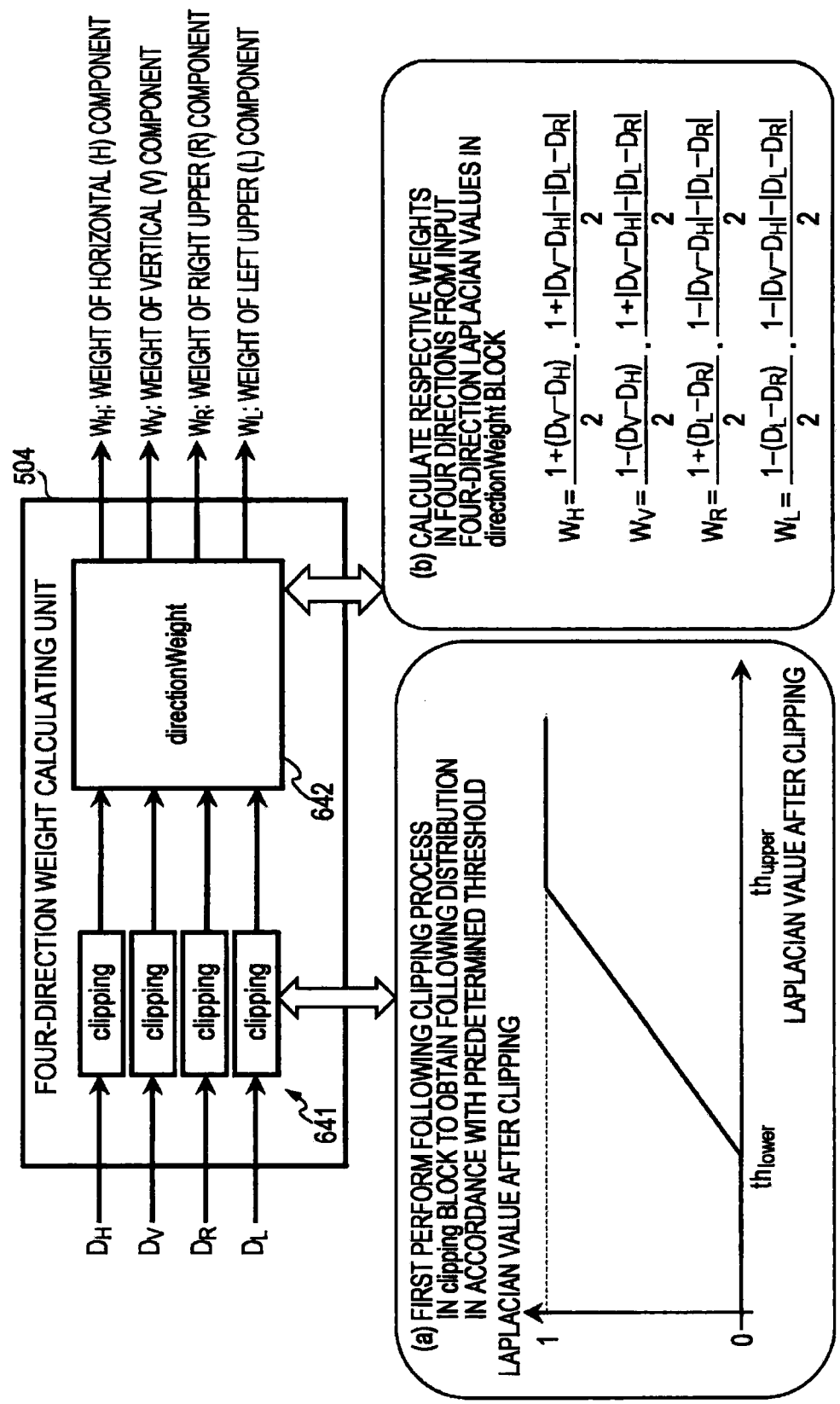
FIG. 33 is a diagram illustrating the process of a four-direction weight calculating unit.

FIG. 33 is a diagram illustrating the detailed configuration of the four-direction weight calculating unit 504. As shown in FIG. 33, the four-direction weight calculating unit 504 includes a clipping unit 641 and a direction weight calculating unit 642.

The clipping unit 641 performs a clipping process on the edge strengths ($D_H$, $D_V$, $D_R$, and $D_L$) of four directions corresponding to the Laplacian value sums input from the four-direction edge strength calculating unit.

An example of the clipping process is shown in part (a) of FIG. 33. The clipping process corresponds to the process described above with reference to FIG. 23. The lower limit threshold value $th_{lower}$ and the upper limit threshold value $th_{upper}$ are set and a weight distribution transitioning in a straight line is set between the lower limit threshold value $th_{lower}$ and the upper limit threshold value $th_{upper}$. The threshold value is set by an actual operation.

The clipping unit 641 generates the edge strengths ($D_H$, $D_V$, $D_R$, and $D_L$) of four directions set in the range of 0 to 1 by the clipping process and outputs the edge strengths to the direction weight calculating unit 642.

The direction weight calculating unit 642 calculates the weights ($W_H$, $W_V$, $W_R$, and $W_L$) for the components of the four directions (the horizontal (H), vertical (V), right upper (R), and left upper (L) directions) by an equation shown in part (b) of FIG. 33 using the edge strengths ($D_H$, $D_V$, $D_R$, and $D_L$) of four directions.

The calculation equation has been described above as Equation 5.

7-5. Process of Blending Processing Unit

Next, the process of the blending processing unit 505 will be described with reference to FIG. 34. The blending processing unit 505 performs the above-described process (the fourth process), that is, the process of calculating the output pixel values by the blending process of multiplying the smoothing G components ($G_H$, $G_V$, $G_R$, and $G_L$) of the horizontal (H), vertical (V), right upper (R), and left upper (L) directions calculated through the second process by the weights ($W_H$, $W_V$, $W_R$, and $W_L$) calculated through the third process.

As shown in FIG. 25, the four-direction interpolated-pixel value calculating unit 503 inputs the smoothing G components ($G_H$, $G_V$, $G_R$, and $G_L$) of the horizontal (H), vertical (V), right upper (R), and left upper (L) directions to the blending processing unit 505.

Further, the four-direction weight calculating unit 504 inputs the weights ($W_H$, $W_V$, $W_R$, and $W_L$) for the components of the four directions (the horizontal (H), vertical (V), right upper (R), and left upper (L) directions).

Figure 34:
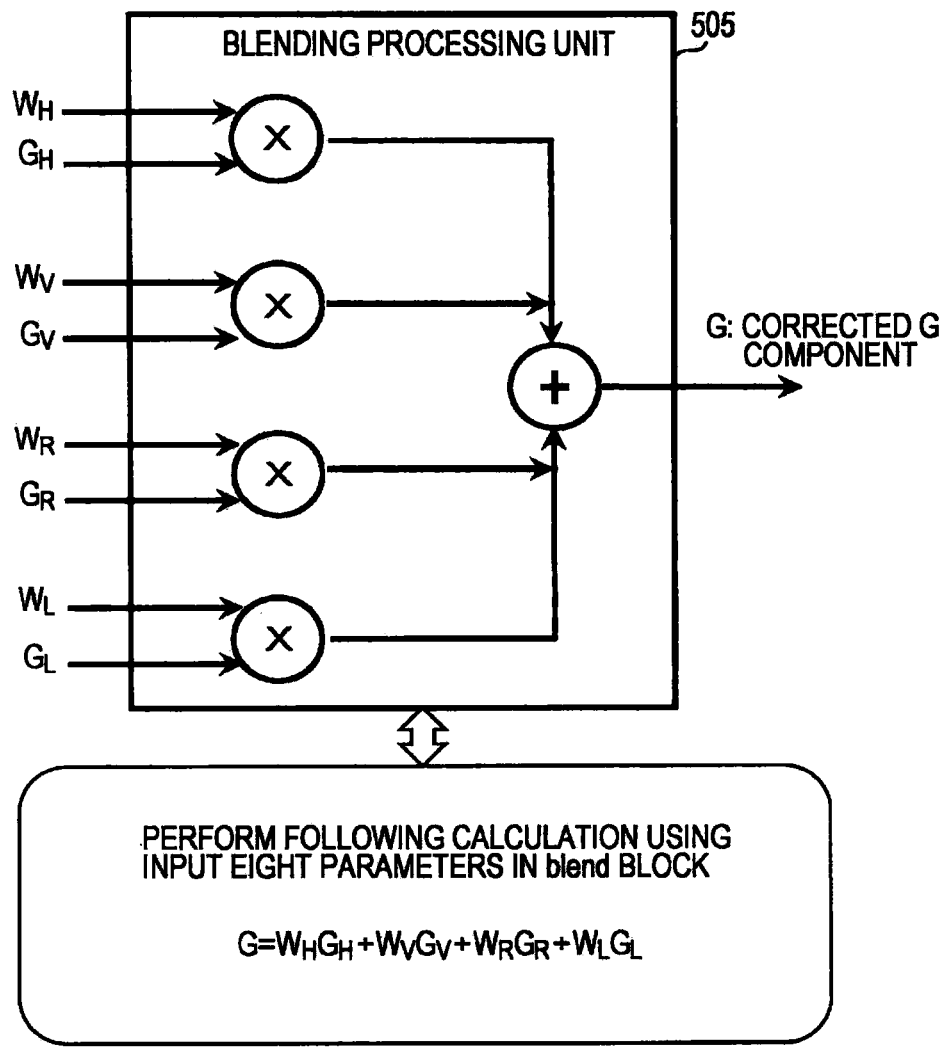
FIG. 34 is a diagram illustrating the process of a blending processing unit.

As shown in FIG. 34, the blending processing unit 505 includes four multiplying units that multiply the smoothing G components ($G_H$, $G_V$, $G_R$, and $G_L$) to the weights ($W_H$, $W_V$, $W_R$, and $W_L$) of the four directions (the horizontal (H), vertical (V), right upper (R), and left upper (L) directions), respectively, and one adding unit that adds the four multiplication results.

In the calculation configuration, the blending process described above by Equation 6 is performed to determine the pixel value (G') of the pixel number reduced and corrected image which is the corrected image of the pixel number reduced image.

That is, the pixel value (G') of the pixel number reduced and corrected image is determined by an equation below.

$$G' = W_H G_H + W_V G_V + W_R G_R + W_L G_L$$

In this example, the pixel value (G') is the pixel value of the center G pixel (Gr or Gb) of the 5×5 pixel block.

The same process is performed on the G pixel of the processed image to determine the pixel value (G') of the pixel number reduced and corrected image.

The G components of which the centroids are deviated in the pixel number reduced image are corrected through this process, and thus the pixel number reduced and corrected image (corresponding to the image shown in part (c) of FIG. 5) in which the deviation in the pixel centroids does not occur.

As a consequence, it is possible to generate a high-quality image in which the jaggies described above with reference to FIG. 3 are suppressed from being generated.

As described above, the pixel number reduced and corrected image generated through the processes is input to the demosaic processing unit 153 shown in FIG. 5, is subjected to the demosaic process of setting the pixel values of RGB pixels at the respective pixel positions, and then is output to a display apparatus or the like or is recorded in a memory.

The entire calculation amount is reduced by the processes. Further, it is possible to generate and output a high-quality image in which the jaggies are reduced and of which the resolution is high.

8. Overview of Configuration of the Present Disclosure

The specific embodiment of the present disclosure has hitherto been described in detail. However, it is apparent to those skilled in the part that the embodiment may, of course, be modified or substituted without departing from the gist of the present disclosure. That is, the embodiment of the present disclosure should not be construed as being limited. To determine the gist of the present disclosure, the claims should be referred to.

The technique disclosed in the specification may be embodied into the following configurations.

(1) An image processing apparatus includes: an edge strength calculating unit that sets, as an input image, a pixel number reduced image obtained by reducing the total number of pixels of an image captured by an imaging element and calculates edge strengths of a plurality of directions in a unit of a pixel block in which a correction object pixel selected from the input image serves as a center pixel; an interpolated-pixel value calculating unit that calculates interpolated-pixel values as smoothing components of the plurality of directions in the pixel block; a weight calculating unit that calculates weights for the interpolated-pixel values as the smoothing components of the plurality of directions based on the edge strengths of the plurality of directions calculated by the edge strength calculating unit; and a blending processing unit that calculates a pixel value of the correction object pixel which is the center pixel of the pixel block by performing a blending process by weighted addition of the interpolated-pixel values, which are the smoothing components of the plurality of directions, and the weights calculated by the weight calculating unit.

(2) In the image processing apparatus according to (1), the plurality of directions are four directions of a horizontal direction, a vertical direction, a right upper direction, and a left upper direction.

(3) In the image processing apparatus according to (1) or (2), the pixel number reduced image is an image having a Bayer arrangement image.

(4) In the image processing apparatus according to any one of (1) to (3), the pixel number reduced image is an image having a Bayer arrangement image and the correction object pixel is a G pixel.

(5) In the image processing apparatus according to any one of (1) to (4), the edge strength calculating unit calculates a plurality of Laplacian absolute values in the unit of the pixel block in which the correction object pixel serves as the center pixel and calculates the edge strengths of the plurality of directions at a position of the correction object pixel by applying the plurality of calculated Laplacian absolute values.

(6) In the image processing apparatus according to any one of (1) to (5), the interpolated-pixel value calculating unit calculates the plurality of smoothing components based on pixel values of pixels present in a line of a specific direction set in the pixel block and calculates an interpolated-pixel value as the smoothing component corresponding to the correction object pixel based on the plurality of calculated smoothing components.

(7) In the image processing apparatus according to any one of (1) to (6), the interpolated-pixel value calculating unit calculates the interpolated-pixel values based on pixels included in the pixel number reduced image and in which centroid deviation occurs.

(8) In the image processing apparatus according to any one of (1) to (7), the weight calculating unit performs a clipping process of applying a predefined clipping function to each of the edge strengths of the plurality of directions calculated by the edge strength calculating unit and calculates the weights for the interpolated-pixel values as the smoothing components of the plurality of directions based on the edge strengths of the plurality of directions subjected to the clipping process.

(9) In the image processing apparatus according to any one of (1) to (8), the pixel number reduced image is an image having a Bayer arrangement image and the correction object pixel is a G pixel. The image processing apparatus further includes a demosaic processing unit that performs a demosaic process on a corrected image having the G pixel output by the blending processing unit.

(10) In the image processing apparatus according to any one of (1) to (9), the demosaic processing unit performs the demosaic process of setting RGB pixel values of the respective pixels using a correlation between the G and R pixels in a Bayer arrangement and a correlation between the G and B pixels in the Bayer arrangement.

(11) The image processing apparatus according to any one of (1) to (10) includes an image correcting unit that calculates an edge direction passing through a center of an object G pixel in a raw image obtained through a pixel adding or thinning process in an imaging element based on a resolution of the raw image which is not subjected to the pixel adding or thinning process and that projects a G pixel near in a straight line perpendicular to the calculated edge direction, performs a re-sampling process on the projected G pixel in a direction perpendicular to an edge, performs a process of determining the pixel value of the object G pixel using a re-sampled signal which is a pixel value of the re-sampled pixel.

(12) In the image processing apparatus according to any one of (1) to (11), the image correcting unit determines the pixel value of the object G pixel by expressing the edge direction by a linear sum of the edge components of predetermined specific directions, performing the re-sampling process on each edge component of the specific direction, and calculating a weighted mean of the re-sampled signals of the plurality of specific directions at a ratio substantially identical to that of the edge components of the expressed linear sum.

The series of processes described above in the specification may be executed by hardware, software, or a combination thereof. When the series of processes are executed by software, a program recording the processing sequence can be installed and executed in a memory of a dedicated embedded hardware computer. Alternatively, the program can be installed and executed in a general computer capable of executing various kinds of processes. For example, the program may be recorded in advance in a recording medium. Not only the program is installed from the recording medium to the computer, but also the program may be received via a network such as LAN (Local Area Network) or the Internet and may be installed in a recording medium such as an internal hard disk or the like.

The various kinds of processes described in the specification may be executed chronologically in accordance with the description and may be executed in parallel or separately in accordance with the processing capability of an apparatus executing the processes, as necessary. A system in the specification has a logic collection configuration of a plurality of apparatuses. The apparatuses with a separate configuration may not be included in the same casing.

The present disclosure contains subject matter related to that disclosed in Japanese Priority Patent Application JP 2011-053728 filed in the Japan Patent. Office on Mar. 11, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
one or more circuits configured to:
set as an input image, a pixel number reduced image obtained by reducing a total number of pixels of an image captured by an imaging element;
calculate a plurality of Laplacian absolute values in a pixel block in which a correction object pixel selected from the input image serves as a center pixel;
calculate edge strengths of a plurality of directions in the pixel block at a position of the correction object pixel by applying the plurality of Laplacian absolute values;
calculate interpolated-pixel values as smoothing components of the plurality of directions in the pixel block;
calculate weights for the interpolated-pixel values as the smoothing components of the plurality of directions based on the edge strengths of the plurality of directions; and
calculate a pixel value of the correction object pixel, which is the center pixel of the pixel block, by performing a blending process by weighted addition of the interpolated-pixel values, which are the smoothing components of the plurality of directions, and the weights for the interpolated-pixel values.

2. The image processing apparatus according to claim 1, wherein the plurality of directions are four directions of a horizontal direction, a vertical direction, a right upper direction, and a left upper direction.

3. The image processing apparatus according to claim 1, wherein the pixel number reduced image is an image having a Bayer arrangement image.

4. The image processing apparatus according to claim 1, wherein the pixel number reduced image is an image having a Bayer arrangement image and the correction object pixel is a G pixel of an RGrGbB pixel structure.

5. The image processing apparatus according to claim 1, wherein the one or more circuits are configured to calculate the smoothing components based on pixel values of pixels present in a line of a specific direction set in the pixel block and calculate an interpolated-pixel value as the smoothing component corresponding to the correction object pixel based on the calculated smoothing components.

6. The image processing apparatus according to claim 1, wherein the one or more circuits are configured to calculate the interpolated-pixel values based on pixels included in the pixel number reduced image and in which centroid deviation occurs.

7. The image processing apparatus according to claim 1, wherein the one or more circuits are configured to:
perform a clipping process of applying a predefined clipping function to each of the edge strengths of the plurality of directions; and
calculate the weights for the interpolated-pixel values as the smoothing components of the plurality of directions based on the edge strengths of the plurality of directions subjected to the clipping process.

8. The image processing apparatus according to claim 1, wherein the pixel number reduced image is an image having a Bayer arrangement image and the correction object pixel is a G pixel of an RGrGbB pixel structure, and
wherein the one or more circuits are configured to perform a demosaic process on a corrected image having the G pixel output by the blending process.

9. The image processing apparatus according to claim 8, wherein the one or more circuits are configured to perform the demosaic process of setting RGB pixel values of respective pixels using a correlation between the G and R pixels in a Bayer arrangement and a correlation between the G and B pixels in the Bayer arrangement.

10. An image processing apparatus comprising:
one or more circuits configured to:
calculate an edge direction passing through a center of an object G pixel in a raw image obtained through a pixel adding process or a pixel thinning process in an imaging element based on a resolution of the raw image which is not subjected to the pixel adding process or the pixel thinning process;
project a G pixel in a straight line perpendicular to the calculated edge direction;
perform a re-sampling process on the projected G pixel in a direction perpendicular to the edge direction;
perform a process of determining a pixel value of the object G pixel using a re-sampled signal which is a pixel value of the re-sampled G pixel.

11. The image processing apparatus according to claim 10, wherein the the one or more circuits are configured to:
determine the pixel value of the object G pixel by expressing the edge direction as a linear sum of edge components of predetermined specific directions;
perform the re-sampling process on each edge component of the predetermined specific directions; and
calculate a weighted mean of re-sampled signals of the predetermined specific directions at a ratio substantially identical to that of the edge components of the expressed linear sum.

12. An imaging apparatus comprising:
an imaging element; and
one or more circuits configured to:
generate a pixel number reduced image by reducing a total number of pixels of an image captured by the imaging element;
set the pixel number reduced image as an input image;
calculate edge strengths of a plurality of directions in a pixel block in which a correction object pixel selected from the input image serves as a center pixel;
perform a clipping process of applying a predefined clipping function to each of the edge strengths of the plurality of directions;
calculate interpolated-pixel values as smoothing components of the plurality of directions in the pixel block;
calculate weights for the interpolated-pixel values as the smoothing components of the plurality of directions based on the edge strengths of the plurality of directions subjected to the clipping process; and
calculate a pixel value of the correction object pixel, which is the center pixel of the pixel block, by performing a blending process by weighted addition of the interpolated-pixel values, which are the smoothing components of the plurality of directions, and the weights for the interpolated-pixel values.

13. An image processing method comprising:
in an image processing apparatus:
setting, as an input image, a pixel number reduced image obtained by reducing a total number of pixels of an image captured by an imaging element;
calculating a plurality of Laplacian absolute values in a pixel block in which a correction object pixel selected from the input image serves as a center pixel;
calculating edge strengths of a plurality of directions in the pixel block at a position of the correction object pixel by applying the plurality of Laplacian absolute values;
calculating interpolated-pixel values as smoothing components of the plurality of directions in the pixel block;
calculating, weights for the interpolated-pixel values as the smoothing components of the plurality of directions based on the edge strengths of the plurality of directions; and
calculating, a pixel value of the correction object pixel, which is the center pixel of the pixel block, by performing a blending process by weighted addition of the interpolated-pixel values, which are the smoothing components of the plurality of directions, and the weights for the interpolated-pixel values.

14. A non-transitory computer-readable storage medium having stored thereon, a computer program having at least one code section, the at least one code section being executable by a computer for causing the computer to perform steps comprising
setting, as an input image, a pixel number reduced image obtained by reducing a total number of pixels of an image captured by an imaging element;
calculating a plurality of Laplacian absolute values in a pixel block in which a correction object pixel selected from the input image serves as a center pixel;
calculating edge strengths of a plurality of directions in the pixel block at a position of the correction object pixel by applying the plurality of Laplacian absolute values;
calculating, interpolated-pixel values as smoothing components of the plurality of directions in the pixel block;
calculating, weights for the interpolated-pixel values as the smoothing components of the plurality of directions based on the edge strengths of the plurality of directions; and calculating, a pixel value of the correction object pixel, which is the center pixel of the pixel block, by performing a blending process by weighted addition of the interpolated-pixel values, which are the smoothing components of the plurality of directions, and the weights for the interpolated-pixel values.

* * * * *